US012505767B2

(12) United States Patent
Meng et al.

(10) Patent No.: US 12,505,767 B2
(45) Date of Patent: Dec. 23, 2025

(54) METHOD FOR REPAIRING DEFECTIVE PIXEL, DISPLAY MODULE AND DISPLAY APPARATUS

(71) Applicants: Hefei BOE Joint Technology Co., Ltd., Anhui (CN); BOE TECHNOLOGY GROUP CO., LTD., Beijing (CN)

(72) Inventors: Song Meng, Beijing (CN); Jian Mao, Beijing (CN); Cheng Xu, Beijing (CN); Miao Liu, Beijing (CN); Xing Yao, Beijing (CN)

(73) Assignees: Hefei BOE Joint Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/557,312

(22) PCT Filed: Oct. 27, 2022

(86) PCT No.: PCT/CN2022/127956
§ 371 (c)(1),
(2) Date: Oct. 26, 2023

(87) PCT Pub. No.: WO2024/087098
PCT Pub. Date: May 2, 2024

(65) Prior Publication Data
US 2025/0095524 A1 Mar. 20, 2025

(51) Int. Cl.
*G09G 3/32* (2016.01)
*G09G 3/00* (2006.01)
(Continued)

(52) U.S. Cl.
CPC ............... *G09G 3/006* (2013.01); *G09G 3/32* (2013.01); *G09G 3/3266* (2013.01);
(Continued)

(58) Field of Classification Search
CPC ........ G09G 3/006; G09G 3/32; G09G 3/3266; G09G 3/3275; G09G 2310/0267;
(Continued)

(56) References Cited

U.S. PATENT DOCUMENTS

2013/0147858 A1 6/2013 Omoto
2015/0248861 A1 9/2015 Kong et al.
(Continued)

FOREIGN PATENT DOCUMENTS

CN 101201519 A * 6/2008 ............... G02F 1/13
CN 106652961 A 5/2017
(Continued)

*Primary Examiner* — Towfiq Elahi
(74) *Attorney, Agent, or Firm* — Dority & Manning, P.A.

(57) ABSTRACT

A display module includes sub-pixels, data lines, a source driving circuit and a processor. Each sub-pixel includes light-emitting sub-units each including a pixel circuit and at least one light-emitting device. A data line is electrically connected to a sub-pixel. The source driving circuit is electrically connected to the data line. The source driving circuit is configured to output a first or second data signal to the sub-pixel through the data line. The processor is configured to: determine location information of a target sub-pixel; and control, according to the location information, the source driving circuit to output the second data signal to the target sub-pixel, so that a brightness of the target sub-pixel is substantially the same as that of a non-target sub-pixel.

18 Claims, 16 Drawing Sheets

(51) Int. Cl.
*G09G 3/3266* (2016.01)
*G09G 3/3275* (2016.01)

(52) U.S. Cl.
CPC ... *G09G 3/3275* (2013.01); *G09G 2310/0267* (2013.01); *G09G 2310/0275* (2013.01); *G09G 2310/0294* (2013.01); *G09G 2310/08* (2013.01); *G09G 2330/10* (2013.01)

(58) Field of Classification Search
CPC ... G09G 2310/0275; G09G 2310/0294; G09G 2310/08; G09G 2330/10
See application file for complete search history.

(56) References Cited

U.S. PATENT DOCUMENTS

| | | | | |
|---|---|---|---|---|
| 2018/0182834 | A1 | 6/2018 | Toyotaka et al. | |
| 2018/0342206 | A1* | 11/2018 | Zhou | G09G 3/3291 |
| 2020/0327855 | A1* | 10/2020 | Lin | G09G 3/32 |
| 2023/0104974 | A1 | 4/2023 | Lee et al. | |

FOREIGN PATENT DOCUMENTS

| | | | | |
|---|---|---|---|---|
| CN | 108257516 | A | 7/2018 | |
| CN | 109887461 | A * | 6/2019 | G09G 3/32 |
| CN | 112786641 | A | 5/2021 | |
| CN | 114035757 | A | 2/2022 | |
| CN | 114283738 | A | 4/2022 | |
| WO | WO2021223590 | A1 | 11/2021 | |

* cited by examiner

METHOD FOR REPAIRING DEFECTIVE PIXEL, DISPLAY MODULE AND DISPLAY APPARATUS

CROSS-REFERENCE TO RELATED APPLICATION

The present application is a national phase entry under 35 USC 371 of International Patent Application No. PCT/CN2022/127956, filed on Oct. 27, 2022, which is incorporated herein by reference in its entirety.

TECHNICAL FIELD

The present disclosure relates to the field of display technologies, and in particular, to a method for repairing defective pixel, a display module and a display apparatus.

BACKGROUND

With the rapid development of display technologies, display devices have gradually come throughout people's lives. Organic light-emitting diodes (OLEDs) are widely used in smart products such as mobile phones, TVs and notebook computers due to their advantages of self-illumination, low power consumption, wide viewing angle, fast response, high contrast, and flexible display.

SUMMARY

In an aspect, a display module is provided. The display module includes a plurality of sub-pixels, a data line, a source driving circuit and a processor. Each sub-pixel includes a plurality of light-emitting sub-units, each light-emitting sub-unit includes a pixel circuit and at least one light-emitting device, and data signals received by a plurality of pixel circuits in each sub-pixel are the same. The data line is electrically connected to a sub-pixel. The source driving circuit is electrically connected to the data line. The source driving circuit is configured to output a first data signal or a second data signal to the sub-pixel through the data line, and a voltage of the second data signal is different from a voltage of the first data signal.

The processor is electrically connected to the source driving circuit. The processor is configured to: determine location information of a target sub-pixel; and control, according to the location information, the source driving circuit to output the second data signal to the target sub-pixel, so that a brightness of the target sub-pixel is substantially the same as a brightness of a non-target sub-pixel; the target sub-pixel is a sub-pixel in which at least one light-emitting sub-unit fails to emit light, and the non-target sub-pixel is a sub-pixel in which all light-emitting sub-units emit light.

In some embodiments, the display module further includes a sensing voltage signal line and a sampling sensing circuit. The sensing voltage signal line is electrically connected to the sub-pixel. The sampling sensing circuit is electrically connected to the sensing voltage signal line; the sampling sensing circuit is configured to acquire sensing voltage signals of pixel circuits of the sub-pixel through the sensing voltage signal line. The processor is further electrically connected to the sampling sensing circuit, and the processor is further configured to determine a sensing voltage signal of all the pixel circuits of the sub-pixel.

In some embodiments, the display module further includes scanning signal lines and a gate driving circuit. The source driver is electrically connected to the plurality of sub-pixels. The gate driving circuit is electrically connected to the scanning signal lines. The gate driving circuit is configured to output scanning signals to the sub-pixel through the scanning signal lines. The processor is further electrically connected to the gate driving circuit; the processor is further configured to control the gate driving circuit, the source driving circuit and the sampling sensing circuit to acquire a sensing voltage signal of at least one pixel circuit in each sub-pixel.

In some embodiments, the processor is configured to: control the gate driving circuit, the source driving circuit and the sampling sensing circuit to acquire sensing voltage signals of all the pixel circuits in each sub-pixel; determine a sensing voltage signal of any pixel circuit in the non-target sub-pixel as a sensing voltage signal of all pixel circuits in the non-target sub-pixel; and determine whether the target sub-pixel emits light; if so, determine a sensing voltage signal of any pixel circuit electrically connected to a light-emitting device emitting light in the target sub-pixel as a sensing voltage signal of all pixel circuits in the target sub-pixel; and if not, determine a sensing voltage signal of any non-target sub-pixel adjacent to the target sub-pixel as the sensing voltage signal of all the pixel circuits in the target sub-pixel.

In some embodiments, the processor is configured to: control the gate driving circuit, the source driving circuit and the sampling sensing circuit to acquire a sensing voltage signal of a pixel circuit of each sub-pixel; determine a sensing voltage signal acquired from the non-target sub-pixel as a sensing voltage signal of all pixel circuits in the non-target sub-pixel; and determine whether a difference between a sensing voltage signal acquired from the target sub-pixel and a sensing voltage signal acquired from any adjacent non-target sub-pixel is within a first preset range; if so, determine the sensing voltage signal acquired from the target sub-pixel as a sensing voltage signal of all pixel circuits in the target sub-pixel; and if not, determine the sensing voltage signal of any non-target sub-pixel adjacent to the target sub-pixel as the sensing voltage signal of all the pixel circuits in the target sub-pixel.

In some other examples, the processor is configured to: control the gate driving circuit, the source driving circuit and the sampling sensing circuit to acquire an average sensing voltage signal of the plurality of pixel circuits in each sub-pixel; determine an average sensing voltage signal acquired from the non-target sub-pixel as a sensing voltage signal of all pixel circuits in the non-target sub-pixel; and determine an average sensing voltage signal of any non-target sub-pixel adjacent to the target sub-pixel as a sensing voltage signal of all pixel circuits in the target sub-pixel.

In some embodiments, the processor is configured to: control the source driving circuit to output the second data signal to a pixel circuit connect to a light-emitting device emitting light in the target sub-pixel; and control the source driving circuit to output no data signal to a pixel circuit connected to a light-emitting device failing to emit light in the target sub-pixel.

In some embodiments, the display module further includes scanning signal lines, and among the plurality of sub-pixels, all light-emitting sub-units in the plurality of sub-pixels are arranged in a plurality of rows and a plurality of columns; each row includes light-emitting sub-units arranged in a first direction, and each column includes light-emitting sub-units arranged in a second direction; the first direction is substantially the same as an extending direction of the scanning signal lines, and the second direction is substantially the same as an extending direction of the data line. Light-emitting sub-units in a same row are electrically connected to the same scanning signal lines, and light-emitting sub-units in a same column are electrically connected to a same data line. In a case where the display module comprises sensing voltage signal lines, the light-emitting sub-units in the same column are further electrically connected to a same sensing voltage signal line.

In some embodiments, the light-emitting sub-units in the same column are divided into sub-pixels, and each sub-pixel includes two light-emitting sub-units.

In some embodiments, the pixel circuit in each sub-pixel includes a driving sub-circuit, and the driving sub-circuit is coupled to a first scanning signal terminal, a second scanning signal terminal, a data signal terminal and a sensing voltage signal terminal; the driving sub-circuit being configured to output a grayscale current signal to the at least one light-emitting device under a control of a first scanning signal terminal from the first scanning signal terminal and a second scanning signal from the second scanning signal terminal.

In a case where each light-emitting sub-unit includes a pixel circuit and a light-emitting device, an anode of the light-emitting device is coupled to the driving sub-circuit, and a cathode of the light-emitting device is coupled to a second voltage signal terminal. In a case where each light-emitting sub-unit includes a pixel circuit and a plurality of light-emitting devices, the plurality of light-emitting devices include a first light-emitting device and a second light-emitting device. An anode of the first light-emitting device is coupled to a first voltage signal terminal, and a cathode of the first light-emitting device is coupled to the driving sub-circuit. An anode of the second light-emitting device is coupled to the driving sub-circuit, and a cathode of the second light-emitting device is coupled to the second voltage signal terminal.

In some embodiments, the driving sub-circuit includes a first transistor, a second transistor, a third transistor, and a storage capacitor. A control electrode of the first transistor is coupled to the first scanning signal terminal, a first electrode of the first transistor is coupled to the data signal terminal, and a second electrode of the first transistor is coupled to a first node. A control electrode of the second transistor is coupled to the second scanning signal terminal, a first electrode of the second transistor is coupled to the sensing voltage signal terminal, and a second electrode of the second transistor is coupled to a second node. A control electrode of the third transistor is coupled to the first node, a first electrode of the third transistor is coupled to a third node, and a second electrode of the third transistor is coupled to the second node. A first electrode plate of the storage capacitor is coupled to the first node, and a second electrode plate of the storage capacitor is coupled to the second node.

In some embodiments, in the case where each light-emitting sub-unit includes a pixel circuit and a plurality of light-emitting devices, the pixel circuit in each sub-pixel further includes a switch sub-circuit coupled to a third scanning terminal. The switch sub-circuit is configured to: under a control of a third scanning signal from the third scanning signal terminal, cause the grayscale current signal to be output to both the first light-emitting device and the second light-emitting device, or cause the grayscale current signal to be output to the second light-emitting device and no grayscale current signal to be output to the first light-emitting device.

In some embodiments, the display module includes a gate driving circuit and scanning signal lines. The third scanning signal terminal and the first scanning signal terminal are electrically connected to different scanning signal lines, and the third scanning signal terminal and the second scanning signal terminal are electrically connected to different scanning signal lines. The switch sub-circuit is connected to the first light-emitting device in parallel, and the processor is further configured to determine whether the second light-emitting device is short-circuited; if so, control the gate driving circuit to output a non-operation voltage to the third scanning signal terminal of the pixel circuit to turn off the switch sub-circuit; if not, control the gate driving circuit to output an operation voltage to the third scanning signal terminal of the pixel circuit to turn on the switch sub-circuit.

In some embodiments, at least two of the first scanning signal terminal, the second scanning signal terminal and the third scanning signal terminal are coupled to a same scanning signal line.

In some embodiments, an area of a light-emitting region of the first light-emitting device is greater than an area of a light-emitting region of the second light-emitting device.

In some embodiments, the voltage of the second data signal is greater than the voltage of the first data signal.

In another aspect, a display apparatus is provided. The display apparatus includes the display module as described in any one of the above embodiments.

In yet another aspect, a method for repairing defective pixel is provided. The method for repairing defective pixel is applied to the display module described in any one of the above embodiments, including: determining a location of the target sub-pixel; controlling, according to the location of the target sub-pixel, the source driving circuit to output the second data signal to the target sub-pixel, so that the brightness of the target sub-pixel is substantially the same as the brightness of the non-target sub-pixel.

In some embodiments, the display module further includes a sampling sensing circuit and a gate driving circuit. The method for repairing defective pixel further includes: controlling the gate driving circuit, the source driving circuit and the sampling sensing circuit acquire sensing voltage signals of all pixel circuits in each sub-pixel; determining a sensing voltage signal of any pixel circuit in the non-target sub-pixel as a sensing voltage signal of all pixel circuits in the non-target sub-pixel; and determining whether the target sub-pixel emits light; if so, determining a sensing voltage signal of any pixel circuit electrically connected to a light-emitting device emitting light in the target sub-pixel as a sensing voltage signal of all pixel circuits in the target sub-pixel; and if not, determining a sensing voltage signal of any non-target sub-pixel adjacent to the target sub-pixel as the sensing voltage signal of all the pixel circuits in the target sub-pixel.

In some embodiments, the display module further includes a sampling sensing circuit and a gate driving circuit. The method for repairing defective pixel further includes: controlling the gate driving circuit, the source driving circuit and the sampling sensing circuit to acquire a sensing voltage signal of a pixel circuit in each sub-pixel; determining a sensing voltage signal acquired from the non-target sub-pixel as a sensing voltage signal of all pixel circuits in the non-target sub-pixel; and determining whether a difference between a sensing voltage signal acquired from the target sub-pixel and a sensing voltage signal acquired from any adjacent non-target sub-pixel is within a first preset range; if so, determining the sensing voltage signal of the pixel circuit in the target sub-pixel as a sensing voltage signal of all pixel circuits in the target sub-pixel; and if not, determining the sensing voltage signal of any non-target sub-pixel adjacent to the target sub-pixel as the sensing voltage signal of all the pixel circuits in the target sub-pixel.

In some embodiments, the display module further includes a sampling sensing circuit and a gate driving circuit. The method for repairing defective pixel further includes: controlling the gate driving circuit, the source driving circuit and the sampling sensing circuit to acquire an average sensing voltage signal of a plurality of pixel circuits in each sub-pixel; determining an average sensing voltage signal acquired from the non-target sub-pixel as a sensing voltage signal of all pixel circuits in the non-target sub-pixel; and determining an average sensing voltage signal acquired from any non-target sub-pixel adjacent to the target sub-pixel as a sensing voltage signal of all pixel circuits in the target sub-pixel.

In some embodiments, determining the location of the target sub-pixel includes: receiving image data from an optical device; and determining a sub-pixel with a low brightness as the target sub-pixel according to the image data, and acquiring the location of the target sub-pixel.

In some embodiments, the display module further includes a sampling sensing circuit. Determining the location of the target sub-pixel includes: receiving a sensing voltage signal group from the sampling sensing circuit; the sensing voltage signal group including sensing voltage signals of all pixel circuits; determining an abnormal sensing voltage signal; the abnormal sensing voltage signal being a sensing voltage signal in the sensing voltage signal group whose difference from another adjacent sensing voltage signal is outside a first preset range; determining a sub-pixel corresponding to the abnormal sensing voltage signal as the target sub-pixel; and acquiring the location of the target sub-pixel.

In some embodiments, the display module further includes a gate driving circuit; each light-emitting sub-unit includes a pixel circuit, a first light-emitting device and a second light-emitting device, and the pixel circuit includes a switch sub-circuit coupled to a third scanning signal terminal. The method for repairing defective pixel further includes: determining whether the second light-emitting device is short-circuited; if so, controlling the gate driving circuit to output a non-operation voltage to the third scanning signal terminal of the pixel circuit to turn off the switch sub-circuit; and if not, controlling the gate driving circuit to output an operation voltage to the third scanning signal terminal of the pixel circuit to turn on the switch sub-circuit.

In yet another aspect, a non-transitory computer-readable storage medium is provided. The computer-readable storage medium has stored thereon computer program instructions that, when executed on a computer (e.g., a display apparatus), cause the computer to perform the method for repairing defective pixel as described in any one of the above embodiments.

In yet another aspect, a computer program product is provided. The computer program product is stored on a non-transitory computer-readable storage medium and includes computer program instructions, and when executed on a computer (e.g., a display apparatus), the computer program instructions causes the computer to perform the method for repairing defective pixel according to the foregoing embodiments.

In yet another aspect, a computer program is provided. When executed on a computer (e.g., a display apparatus), the computer program causes the computer to perform the method for repairing defective pixel as described in the above embodiments.

BRIEF DESCRIPTION OF THE DRAWINGS

In order to describe technical solutions in some embodiments of the present disclosure more clearly, the accompanying drawings to be used in some embodiments of the present disclosure will be introduced briefly. Obviously, the accompanying drawings to be described below are merely some embodiments of the present disclosure, and a person of ordinary skill in the art can obtain other drawings according to those drawings. In addition, accompanying drawings in the following description may be regarded as schematic diagrams, and are not limitations on an actual size of a product, an actual process of a method and an actual timing of signals involved in the embodiments of the present disclosure.

DETAILED DESCRIPTION

Figure 1:
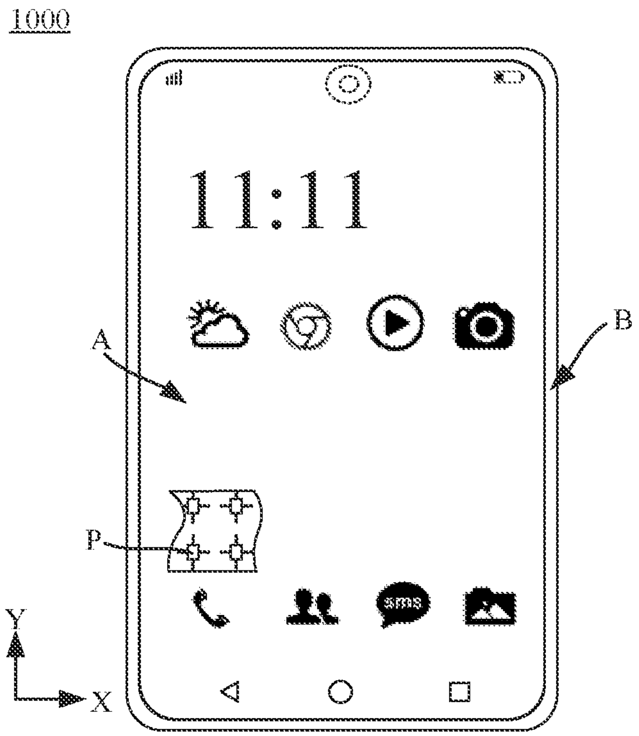
FIG. 1 is a structural diagram of a display apparatus, in accordance with some embodiments.

The technical solutions in some embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, the term such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials or characteristics may be included in any one or more embodiments or examples in any suitable manner.

Hereinafter, the terms "first" and "second" are only used for descriptive purposes, and are not to be construed as indicating or implying relative importance or implicitly indicating the number of indicated technical features. Thus, a feature defined with the term such as "first" or "second" may explicitly or implicitly include one or more of the features. In the description of the embodiments of the present disclosure, the term "a plurality of" or "the plurality of" means two or more unless otherwise specified.

In the description of some embodiments, terms such as "coupled" and "connected" and their derivatives may be used. The term "connection" is to be understood broadly. For example, "connection" may be a fixed connection, a detachable connection, or an integral connection; it also may be a direct connection or an indirect connection through an intermediate medium. The term "coupled", for example, indicates that two or more elements are in direct physical or electrical contact. The term "coupled" or "communicatively coupled" may also indicate that two or more components are not in direct contact with each other, but still cooperate or interact with each other. The embodiments disclosed herein are not necessarily limited to the context herein.

The phrase "at least one of A, B and C" has the same meaning as the phrase "at least one of A, B or C", both including following combinations of A, B and C: only A, only B, only C, a combination of A and B, a combination of A and C, a combination of B and C, and a combination of A, B and C.

The phrase "A and/or B" includes following three combinations: only A, only B, and a combination of A and B.

As used herein, the term "if" is, optionally, construed to mean "when" or "in a case where" or "in response to determining" or "in response to detecting", depending on the context. Similarly, the phrase "if it is determined" or "if [a stated condition or event] is detected" is, optionally, construed to mean "in a case where it is determined" or "in response to determining" or "in a case where [the stated condition or event] is detected" or "in response to detecting [the stated condition or event]", depending on the context.

The use of "applicable to" or "configured to" herein means an open and inclusive expression, which does not exclude devices that are applicable to or configured to perform additional tasks or steps.

Additionally, the use of the phrase "based on" is meant to be open and inclusive, since a process, step, calculation or other action that is "based on" one or more of the stated conditions or values may, in practice, be based on additional conditions or value beyond those stated.

The term such as "about", "substantially" or "approximately" as used herein includes a stated value and an average value within an acceptable range of deviation of a particular value determined by a person of ordinary skill in the art, considering measurement in question and errors associated with measurement of a particular quantity (i.e., limitations of a measurement system).

As used herein, the term "parallel", "perpendicular" or "equal" includes a stated condition and a condition similar to the stated condition, a range of the similar condition is within an acceptable range of deviation, and the acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the drawings, thicknesses of layers and sizes of regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including deviations due to, for example, manufacturing. For example, an etched region shown as a rectangle shape generally has a curved feature. Therefore, the regions shown in the accompanying drawings are schematic in nature, and their shapes are not intended to show actual shapes of regions in a device, and are not intended to limit the scope of the exemplary embodiments.

Transistors used in the pixel circuit provided by the embodiments of the present disclosure may be thin film transistors (TFTs), metal oxide semiconductor (MOS) transistors, or other switching devices with same properties, and the embodiments of the present disclosure will be described by taking the thin film transistors as an example.

Herein, a control electrode of each thin film transistor of the pixel circuit is a gate of the thin film transistor, a first electrode of the thin film transistor is one of a source and a drain of the thin film transistor, and a second electrode of the thin film transistor is another of the source and the drain of the thin film transistor. Since the source and the drain of the thin film transistor may be symmetrical in structure, the source and the drain thereof may be indistinguishable in structure. That is, there may be no difference in structure between the first electrode and the second electrode of the thin film transistor in the embodiments of the present disclosure. For example, in a case where the thin film transistor is a P-type transistor, a first electrode of the thin film transistor may be a source, and a second electrode of the thin film transistor may be a drain. For example, in a case where the thin film transistor is an N-type transistor, a first electrode of the thin film transistor may be a drain, and a second electrode of the thin film transistor may be a source.

In some embodiments of the present disclosure, storage capacitors may be storage capacitor devices that are fabricated separately through processes. For example, the capacitors are realized by manufacturing special capacitor electrodes, and each capacitor electrode of the storage capacitors may be realized by a metal layer, a semiconductor layer (e.g., doped with polysilicon), or the like. The storage capacitors may also each be realized by a parasitic capacitor between transistors, by a parasitic capacitor between a transistor and another device or line, or by a parasitic capacitor between lines of a circuit.

In the embodiments of the present disclosure, a term "operation level" refers to a level that may cause an operated transistor included therein to be turned on, and accordingly a term "non-operation level" or "non-turning-on level" refers to cause an operated transistor included therein not to be turned on (i.e., the transistor being turned off). Depending on factors such as the type (N-type or P-type) of the transistor, the operation level may be higher or lower than the non-operation level. In general, for the square wave pulse signal used during the operation of the pixel circuit, the operation level corresponds to a level of a square wave pulse part of the square wave pulse signal, and the non-operation level corresponds to a level of a non-square wave pulse part.

As shown in FIG. 1, some embodiments of the present disclosure provide a display apparatus 1000, and the display apparatus 1000 may be any device that displays an image whether in motion (e.g., video) or stationary (e.g., a still image), and whether textual or pictorial.

For example, the display apparatus 1000 may be any product or component having a display function, such as a television, a notebook computer, a tablet computer, a mobile phone, a personal digital assistant (PDA), a navigator, a wearable device, or a virtual reality (VR) device.

Figure 2:
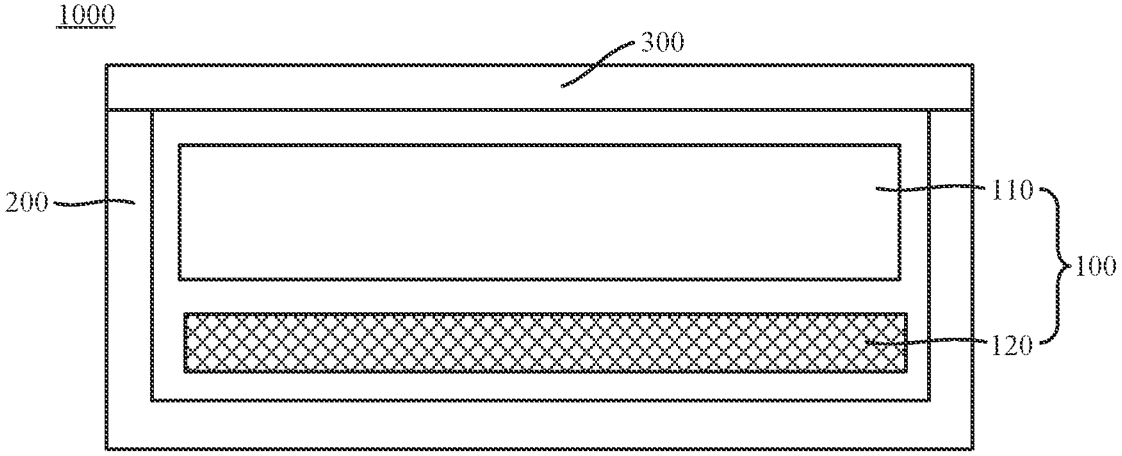
FIG. 2 is a sectional view of a display apparatus, in accordance with some embodiments.

In some embodiments, referring to FIG. 2, the display apparatus 1000 includes a display module 100.

For example, as shown in FIGS. 1 and 2, the display apparatus 1000 further includes a frame 200 and a cover glass 300.

A longitudinal section of the frame 200 is U-shaped, the cover glass 300 is disposed on an opening side of the frame 200, and the display module 100 is disposed in the frame 200.

In some embodiments, referring to FIG. 2, the display module 100 includes a display panel 110.

Figure 3:
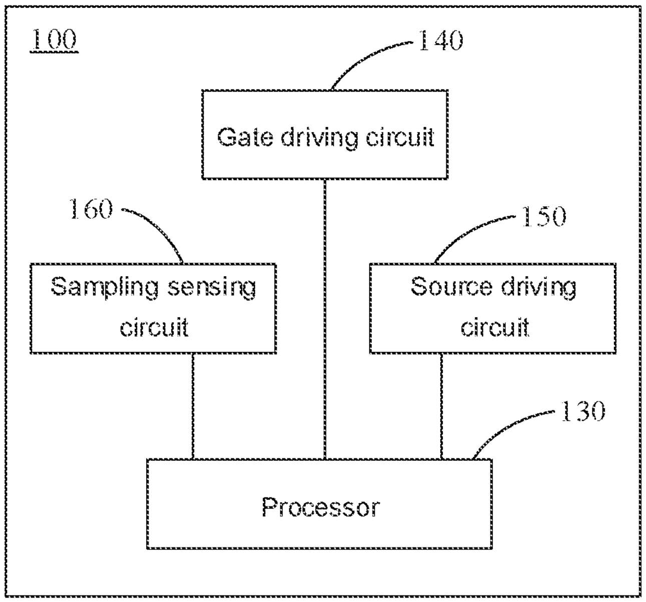
FIG. 3 is a circuit block diagram of a display module, in accordance with some embodiments.

For example, as shown in FIGS. 2 and 3, the display module 100 further includes a circuit board 120, a processor 130, and other electronic accessories. The circuit board 120 is disposed on a side of the display panel 110 away from the cover glass 300, and the processor 130 may be disposed on the circuit board 120.

Figure 4:
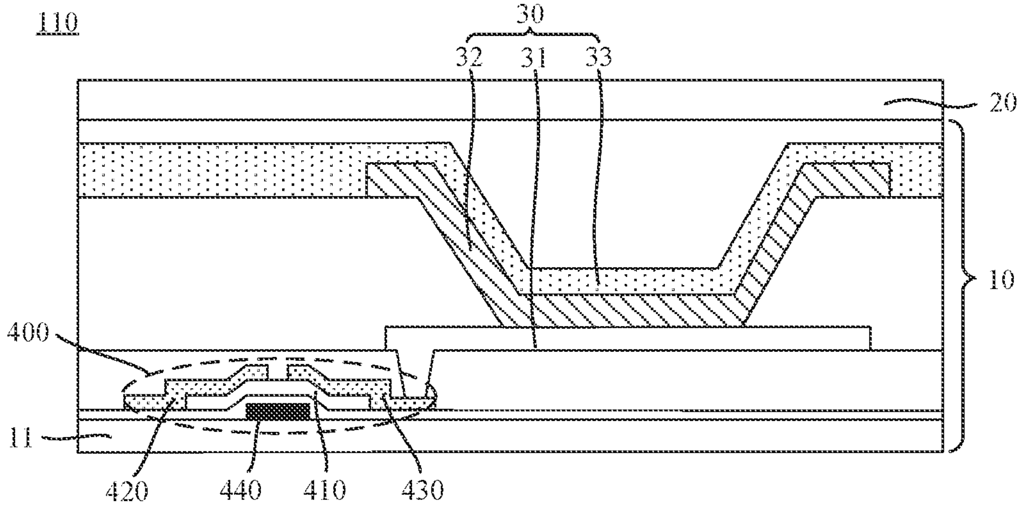
FIG. 4 is a sectional view of a display panel, in accordance with some embodiments.

In some embodiments, referring to FIG. 4, the display panel 110 includes a display substrate 10 and an encapsulation layer 20 for encapsulating the display substrate 10.

As shown in FIG. 4, the display substrate 10 has a light exit side and a non-light-exit side oppositely disposed, and the encapsulation layer 20 is disposed on the light exit side, i.e., the upper side in FIG. 4, of the display substrate 10. Herein, the encapsulation layer 20 may be an encapsulation film or an encapsulation substrate.

Figure 5:
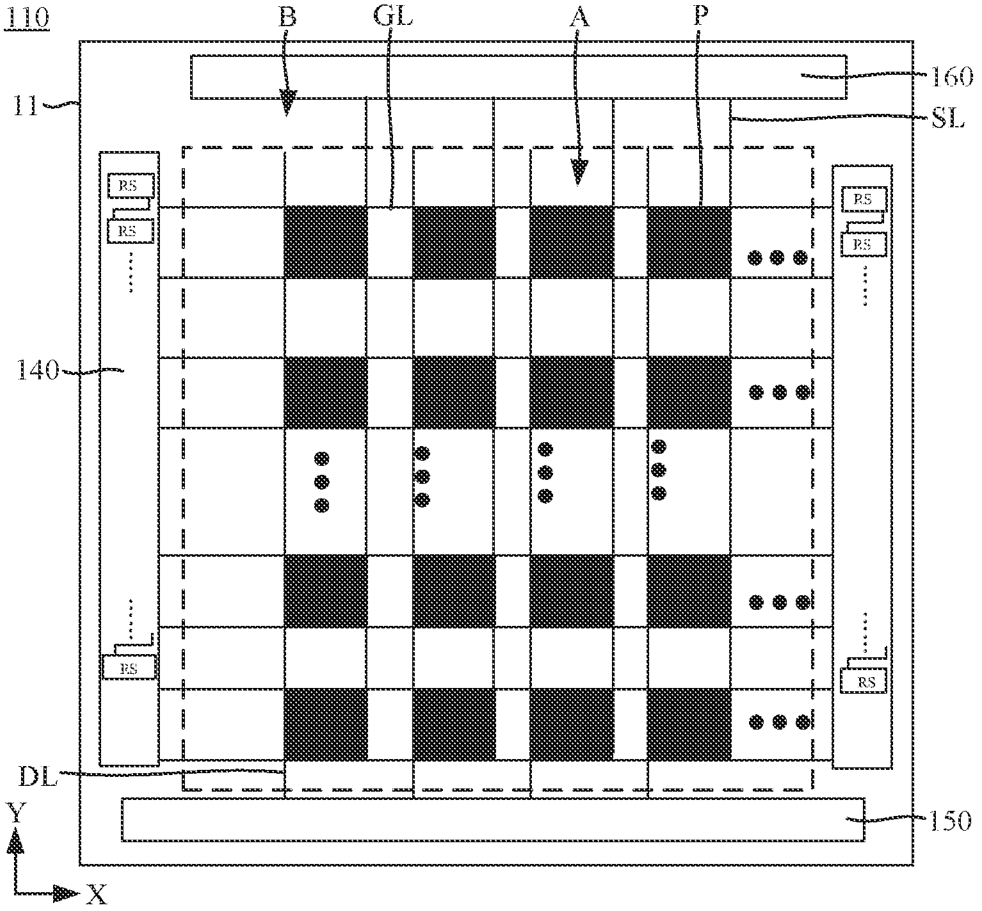
FIG. 5 is a structural diagram of a display panel, in accordance with some embodiments.

Referring to FIGS. 1 and 5, the display panel 110 has a display area A and a peripheral area B disposed on at least one side of the display area A. FIGS. 1 and 5 are illustrated by taking an example in which the peripheral area B is disposed around the display area A.

The display area A is an area for displaying images, and is configured to provide a plurality of sub-pixels P therein. The peripheral area B is an area where no image is displayed, and the peripheral area B is configured to provide display driving circuits, for example, gate driving circuits 140 and a source driving circuit 150.

For example, referring to FIGS. 4 and 5, the display panel 110 includes a substrate 11 and a plurality of sub-pixels P disposed on a side of the substrate 1 and located in the display area A.

The substrate 11 may be of various types, which is determined according to actual needs.

For example, the substrate 11 is a rigid substrate. For example, the rigid substrate may be a glass substrate, a polymethyl methacrylate (PMMA) substrate or the like.

For example, the substrate 11 is a flexible substrate. For example, the flexible substrate may be a polyethylene terephthalate (PET) substrate, a polyethylene naphthalate two formic acid glycol ester (PEN) substrate, a polyimide (PI) substrate, or the like.

Referring to FIGS. 1 and 5, the plurality of sub-pixels P may include first sub-pixels emitting light of a first color, second sub-pixels emitting light of a second color and third sub-pixels emitting light of a third color.

It will be noted that, the first color, the second color and the third color are three primary colors. For example, the first color is red, the second color is green, and the third color is blue.

Figure 6A:
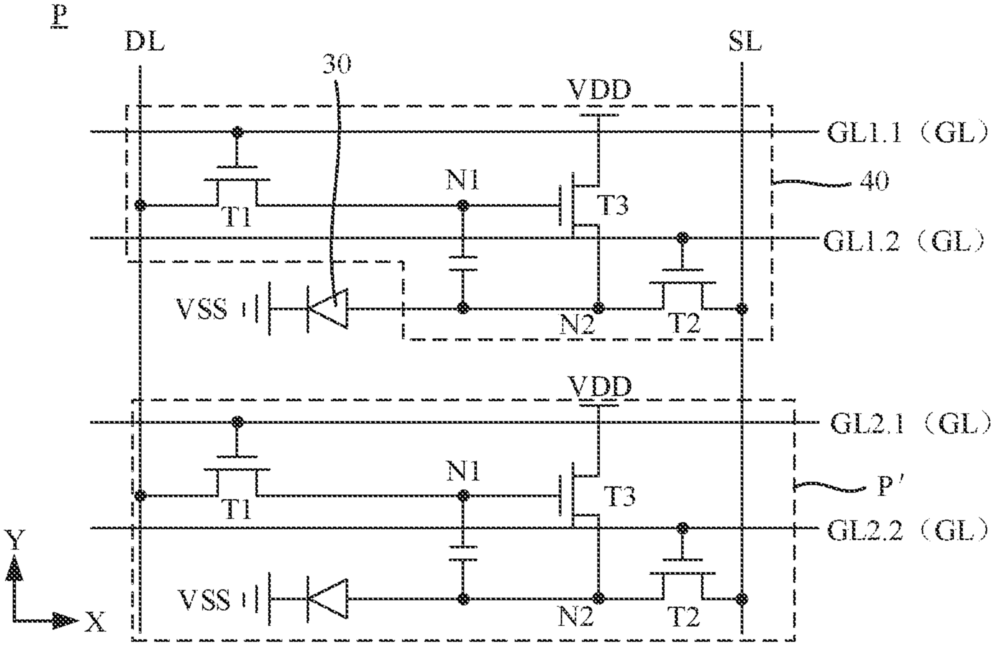
FIG. 6A is a circuit diagram of a sub-pixel, in accordance with some embodiments.

Referring to FIGS. 4 and 6A, each sub-pixel P includes a light-emitting device 30 and a pixel circuit 40 that are disposed on a substrate 11.

A structure of the light-emitting device 30 varies, which may be set according to actual needs. For example, the light-emitting device 30 may be an organic light-emitting diode (OLED), a quantum dot light-emitting diode (QLED), or a micro light-emitting diode (micro LED), which is not specifically limited in the embodiments of the present disclosure.

Some embodiments of the present disclosure will be schematic described below by taking an example in which the light-emitting device 30 is an OLED.

As shown in FIGS. 4 and 6A, the pixel circuit includes thin film transistors 400. The thin film transistor includes a semiconductor channel 410, a source 420, a drain 430 and a gate 440, and the source 420 and the drain 430 are respectively in contact with the semiconductor channel 410.

It will be noted that the source 420 and drain 430 can be interchanged; that is, 420 in FIG. 4 represents a drain, and 430 in FIG. 4 represents a source.

As shown in FIG. 4, the light-emitting device 30 includes an anode 31, a light-emitting functional layer 32 and a cathode 33, and the anode 31 is electrically connected to a source 420 or a drain 430 of a thin film transistor 400 in the thin film transistors 400. FIG. 4 is illustrated by taking an example in which the anode 31 is electrically connected to the drain 430 of the thin film transistor 400.

It will be understood that a structure of the pixel circuit 40 varies, which may be set according to actual needs. For example, the structure of the pixel circuit may be a structure of "2T1C", "3T1C", "6T1C", "7T1C", "6T2C", or "7T2C". Here, "T" represents a transistor, a number before "T" represents the number of the thin film transistors, "C" represents a storage capacitor, and a number before "C" represents the number of storage capacitors.

In addition, during the usage of the display panel 110, stabilities of the transistors in the pixel circuit 40 and the light-emitting devices 30 may decrease (for example, a threshold voltage of a driving transistor drifts), which affects a display effect of the display panel 110. Thus, there is a need to compensate the sub-pixel P.

The manner for compensating the sub-pixel P may vary, which may be set according to actual needs. For example, a pixel compensation circuit may be provided in the sub-pixel P, so as to perform an internal compensation on the sub-pixel P by using the pixel compensation circuit. For another example, a transistor in the sub-pixel P may be used to sense the driving transistor or the light-emitting device, and transmit the sensed data to an external sensing circuit, and then the external sensing circuit is used to calculate a driving voltage value required for compensation and perform feedback, thereby realizing an external compensation for the sub-pixel P.

The embodiments of the present disclosure will be schematically illustrated by taking an example in which a manner of external compensation is adopted and the pixel circuit 40 adopts a structure of "3T1C".

Figure 7A:
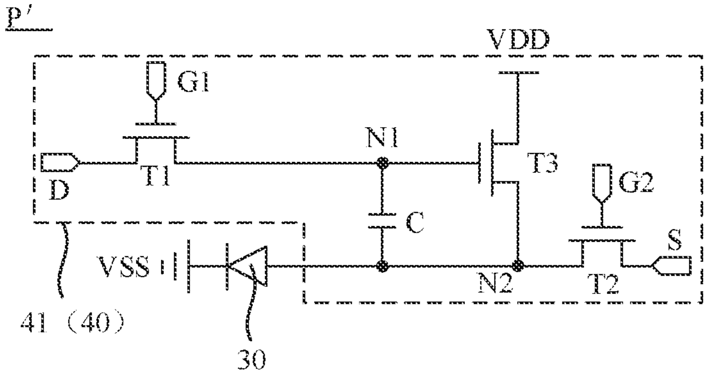
FIG. 7A is a circuit diagram of a light-emitting sub-unit, in accordance with some embodiments.

For example, as shown in FIG. 7A, the pixel circuit 40 includes a first transistor T1, a second transistor T2, a third transistor T3 and a storage capacitor C.

Referring to FIG. 7A, a control electrode of the first transistor T1 is coupled to a first scan signal terminal G1, a first electrode of the first transistor T1 is coupled to a data signal terminal D, and a second electrode of the first transistor T1 is coupled to a first node N1.

It will be noted that, the first node N1 does not represent an actual component, but represent a junction point of related electrical connections in the circuit diagram. That is, the first node N1 is a node equivalent to a junction of relevant electrical connections in the circuit diagram.

Referring to FIG. 7A, a control electrode of the second transistor T2 is coupled to a second gate signal terminal G2, a first electrode of the second transistor T2 is coupled to a sensing voltage signal terminal S, and a second electrode of the second transistor T2 is coupled to a second node N2.

It will be noted that, the second node N2 does not represent an actual component, but represent a junction point of related electrical connections in the circuit diagram. That is, the second node N2 is a node equivalent to a junction of relevant electrical connections in the circuit diagram.

Referring to FIG. 7A, a control electrode of the third transistor T3 is coupled to the first node N1, a first electrode of the third transistor T3 is coupled to a first voltage signal terminal VDD, and a second electrode of the third transistor T3 is coupled to the second node N2. It will be noted that the third transistor T3 serves as a driving transistor in the pixel circuit 40 with a structure of "3T1C".

Referring to FIG. 7A, a first electrode plate of the storage capacitor C is coupled to the first node N1, and a second electrode plate of the storage capacitor C is coupled to the second node N2.

Referring to FIGS. 5 and 6A, the display panel 110 further includes scanning signal lines GL, data lines DL, gate driving circuits 140 and a source driving circuit 150 that are disposed on the substrate 11.

The gate driving circuit 140 is electrically connected to the pixel circuits 40 in the sub-pixels P through the scanning signal line GL, so as to transmit a scanning signal to the pixel circuits 40. The source driving circuit 150 is connected to the pixel circuits 40 in the sub-pixels P through the data line DL, so as to transmit data signals to the pixel circuits 40 to drive each light-emitting device 30 to emit light.

For example, referring to FIGS. 1 and 5, the plurality of sub-pixels P may be arranged in multiple rows and columns, each row may include sub-pixels P arranged in a first direction X, and each column may include sub-pixels P arranged in a second direction Y.

Here, the first direction X is a row direction of the plurality of sub-pixels P arranged in an array, and the second direction Y is a column direction of the plurality of sub-pixels P arranged in an array.

It will be noted that, the definitions of row and column are relative concepts herein, which represent two different extension directions of the array arrangement respectively.

For ease of description, sub-pixels P arranged in a line in the first direction X are referred to as sub-pixels P in a same row; sub-pixels P arranged in a line in the second direction Y are referred to as sub-pixels P in a same column.

In this case, the scanning signal line GL may extend in the first direction X and be electrically connected to the pixel circuits 40 in a row of sub-pixels P; the data line DL may extend in the second direction Y and be electrically connected to the pixel circuits 40 in a column of sub-pixels P.

In the related art, light-emitting devices in some sub-pixels in the display panel do not emit light and form defective pixels, resulting in a decrease in display effect; in a case where the number of the defective pixels exceeds a set number, the display panel cannot be shipped as a product, resulting in a decrease in product yield.

Figure 6B:
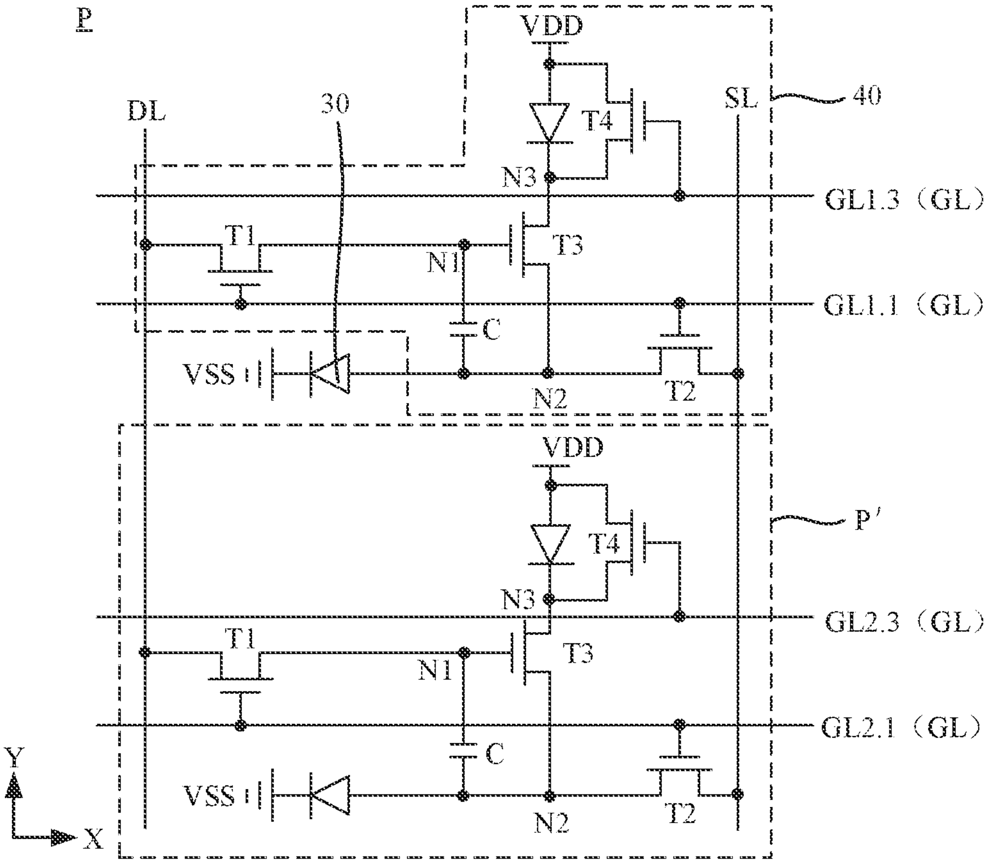
FIG. 6B is a circuit diagram of another sub-pixel, in accordance with some embodiments.
Figure 6C:
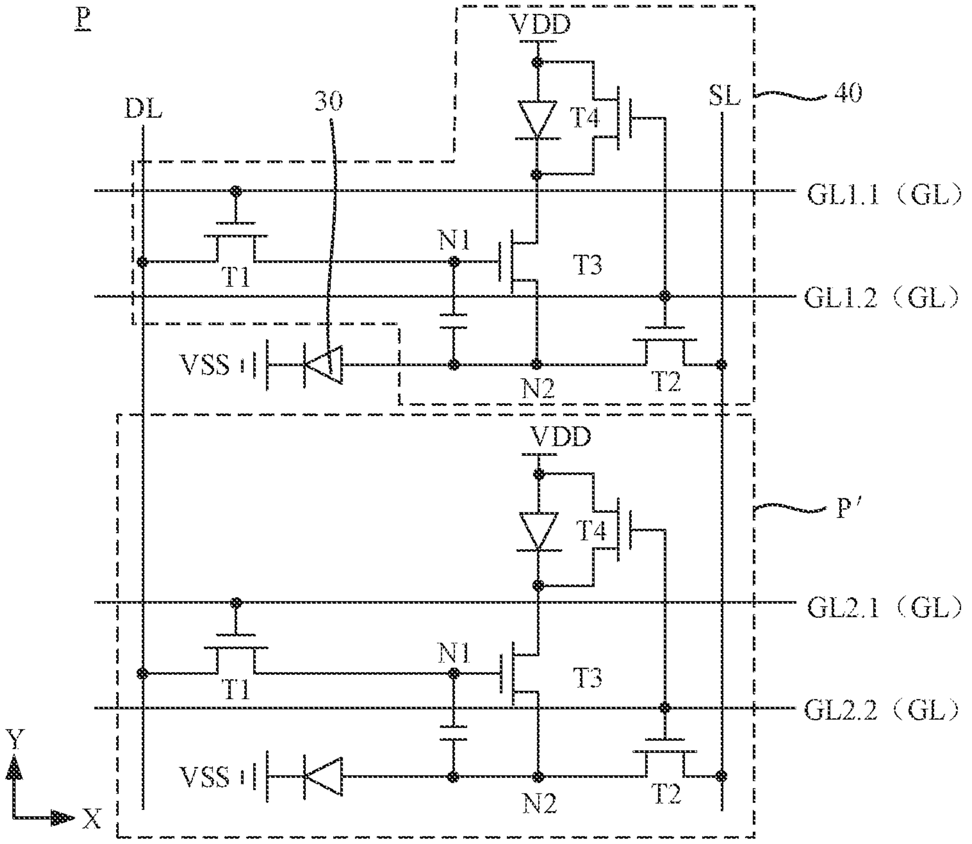
FIG. 6C is a circuit diagram of yet another sub-pixel, in accordance with some embodiments.

Based on this, in the display module 100 provided by some embodiments of the present disclosure, referring to FIGS. 6A, 6B and 6C, each sub-pixel P includes a plurality of light-emitting sub-units P'.

Each light-emitting sub-unit P' includes a pixel circuit 40 and at least one light-emitting device 30, and the pixel circuit 40 in each light-emitting sub-unit P' is electrically connected to the light-emitting device 30.

In some examples, referring to FIG. 7A, each light-emitting sub-unit P' includes a pixel circuit 40 and a single light-emitting device 30.

For example, as shown in FIG. 7A, the pixel circuit 40 includes a driving sub-circuit 41 coupled to the first scanning signal terminal G1, the second scanning signal terminal G2, the data signal terminal D and the sensing voltage signal terminal S. The driving sub-circuit 41 is configured to output a grayscale current signal to the light-emitting device 30 under a control of a first scanning signal from the first scanning signal terminal G1 and a second scanning signal from the second scanning signal terminal G2.

An anode 31 of the light-emitting device 30 is electrically connected to the pixel circuit 40, and a cathode 33 of the light-emitting device 30 is coupled to a second voltage signal terminal VSS.

It will be noted that the second voltage signal terminal VSS is configured to receive a direct current low-level signal, which is referred to as a second voltage signal here.

Here, the driving sub-circuit 41 may be the pixel circuit 40 with the structure of "3T1C" described above. That is, the driving sub-circuit 41 may include a first transistor T1, a second transistor T2, a third transistor T3 and a storage capacitor C.

In this case, the anode 31 of the light-emitting device 30 is electrically connected to the second node N2, and the cathode 33 of the light-emitting device 30 is electrically connected to the second voltage signal terminal VSS.

Figure 7B:
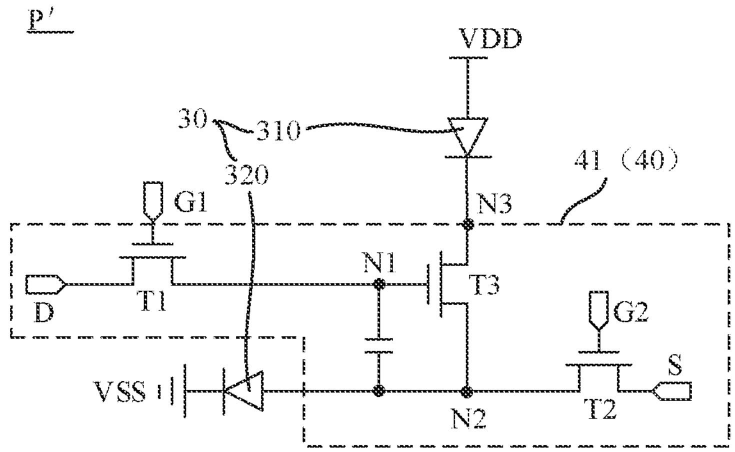
FIG. 7B is a circuit diagram of another light-emitting sub-unit, in accordance with some embodiments.

In some other examples, referring to FIG. 7B, each light-emitting sub-unit P' includes a pixel circuit 40 and multiple light-emitting devices 30. The multiple light-emitting devices 30 include a first light-emitting device 310 and a second light-emitting device 320. FIG. 7B is illustrated by taking an example in which the light-emitting sub-unit includes two light-emitting devices.

It will be noted that an area of a light-emitting region of the first light-emitting device 310 may be greater than an area of a light-emitting region of the second light-emitting device 320. In this way, the failure probability of the first light-emitting device 310 is higher than the failure probability of the second light-emitting device 320. In a case where the first light-emitting device 310 fails, the second light-emitting device 320 may still continue to emit light, thereby reducing a risk of each light-emitting sub-unit P' failing to emit light, and thus reducing a risk of the sub-pixel P failing to emit light.

For example, as shown in FIG. 7B, the pixel circuit 40 includes a driving sub-circuit 41 coupled to the first scanning signal terminal G1, the second scanning signal terminal G2, the data signal terminal D and the sensing voltage signal terminal S. The driving sub-circuit 41 is configured to output a grayscale current signal to the light-emitting device(s) 30 under a control of a first scanning signal from the first scanning signal terminal G1 and a second scanning signal from the second scanning signal terminal G2.

The anode 31 of the first light-emitting device 310 is coupled to the first voltage signal terminal VDD, and the cathode 33 of the first light-emitting device 310 is coupled to the driving sub-circuit 41. The anode 31 of the second light-emitting device 320 is coupled to the driving sub-circuit 41, and the cathode 33 of the second light-emitting device 320 is coupled to the second voltage signal terminal VSS.

It will be noted that the first voltage signal terminal VDD is configured to receive a direct current high-level signal. Here, the direct current high-level signal is referred to as a first voltage signal. For example, a voltage value of the first voltage signal is greater than a voltage value of the second voltage signal.

Here, the driving sub-circuit 41 may be the pixel circuit 40 with the structure of "3T1C" described above. That is, the driving sub-circuit 41 may include a first transistor T1, a second transistor T2, a third transistor T3 and a storage capacitor C. A first electrode of the third transistor T3 is coupled to a third node N3.

In this case, the anode 31 of the first light-emitting device 310 is coupled to the first voltage signal terminal VDD, and the cathode 33 of the first light-emitting device 310 is coupled to the third node N3. In this case, the anode 31 of the second light-emitting device 320 is couple to the second node N2, and the cathode 33 of the second light-emitting device 320 is coupled to the second voltage signal terminal VSS.

In this case, each light-emitting sub-unit P' includes at least two light-emitting devices 30, and the at least two light-emitting devices 30 are connected in series to the driving sub-circuit 41. In this way, in a case where any light-emitting device 30 fails due to short circuit, the remaining light-emitting device(s) 30 may still emit light, thereby reducing the risk of each light-emitting sub-unit P' failing to emit light, and thus reducing the risk of sub-pixel P failing to emit light. As a result, the number of defective pixels is reduced, and the display effect and product yield may be improved.

On this basis, referring to FIG. 70, the pixel circuit 40 further includes a switch sub-circuit 42, and the switch sub-circuit 42 is coupled to a third scanning signal terminal G3. The switch sub-circuit 42 is configured to output the grayscale current signal to both the first light-emitting device 310 and the second light-emitting device 320 or output the grayscale current signal to the second light-emitting device 320 and output no grayscale current signal to the first light-emitting device 310 under a control of a third scanning signal from the third scanning signal terminal G3.

Figure 7C:
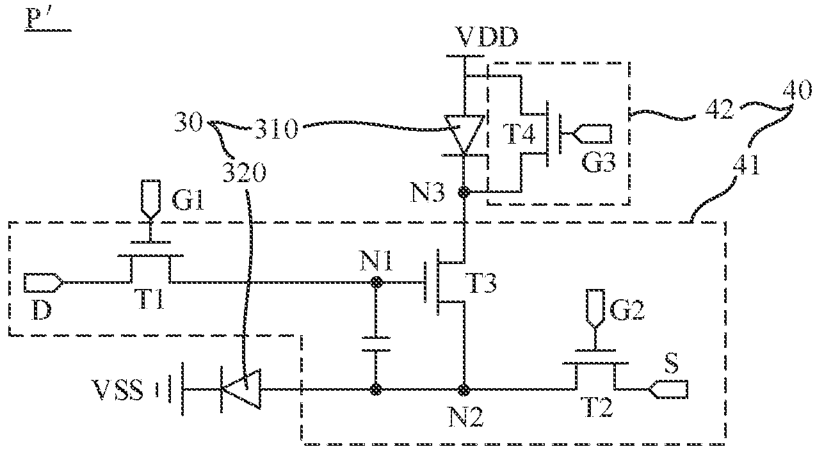
FIG. 7C is a circuit diagram of yet another light-emitting sub-unit, in accordance with some embodiments.

In some embodiments, as shown in FIG. 7C, the switch sub-circuit 42 is coupled to the first light-emitting device 310 in parallel.

For example, as shown in FIG. 7C, the switch sub-circuit 42 includes a fourth transistor T4; a control electrode of the fourth transistor T4 is coupled to the third scanning signal terminal G3, a first electrode of the fourth transistor T4 is coupled to the anode 31 of the first light-emitting device 310, and a second electrode of the fourth transistor T4 is coupled to the cathode 33 of the first light-emitting device 310.

In this case, in a case where the fourth transistor T4 is turned on, the grayscale current signal is output to the second light-emitting device 320 and not output to the first light-emitting device 310. In a case where the fourth transistor T4 is turned off, the grayscale current signal is output to both the first light-emitting device 310 and the second light-emitting device 320.

In some embodiments, referring to FIGS. 6B and 7C, the third scanning signal terminal G3 and the first scanning signal terminal G1 are electrically connected to different scanning signal lines GL, and the third scanning signal terminal G3 and the second scanning signal terminal G2 are electrically connected to different scanning signal lines GL.

In this case, the processor 130 is further configured to determine whether the second light-emitting device 320 is short-circuited.

If so, the gate driving circuit 140 is controlled to output a non-operation voltage to the third scanning signal terminal G3 of the pixel circuit 40 to turn off the switch sub-circuit 42. That is, the grayscale current signal is output to both the first light-emitting device 310 and the second light-emitting device 310. In this case, the second light-emitting device 320 fails to emit light due to the short circuit, and the first light-emitting device 310 emits light normally, thereby reducing the risk of the light-emitting sub-unit P' failing to emit light due to the short circuit of the second light-emitting device 320 and improving the product yield.

If not, the gate driving circuit 140 is controlled to output an operation voltage to the third scanning signal terminal of the pixel circuit 40 to turn on the switch sub-circuit 42. That is, the grayscale current signal is output to the second light-emitting device 320, and not output to the first light-emitting device 310. In this case, the first light-emitting device 310 is connected to the switch sub-circuit 42 in parallel, the first light-emitting device 310 fails to emit light, and the second light-emitting device 320 emits light normally, which may avoid a significant difference between the brightness of the sub-pixel P in which both the first light-emitting device 310 and the second light-emitting device 320 emit light and the brightness of the sub-pixel P in which only the first light-emitting device 310 emits light.

It will be noted that, during the control process described above, any one of the first light-emitting device 310 and the second light-emitting device 320 in each sub-pixel P emits light to reach the set brightness.

In some embodiments, referring to FIGS. 6B, 6C and 7C, at least two of the first scanning signal terminal G1, the second scanning signal terminal G2 and the third scanning signal terminal G3 are coupled to a same scanning signal line GL.

In some examples, as shown in FIGS. 6B and 7C, the first scanning signal terminal G1 and the second scanning signal terminal G2 are coupled to a same scanning signal line GL, and the second scanning signal terminal G2 and the third scanning signal terminal G3 are coupled to different scanning signal lines GL.

For example, as shown in FIGS. 6B and 7C, the first scanning signal terminal G1 and the second scanning signal terminal G2 are electrically connected to a first scanning signal line GL1.1, and the third scanning signal terminal G3 is electrically connected to a third scanning signal line GL1.3.

In this case, the processor 130 may still be configured to determine whether the second light-emitting device 320 is short-circuited.

If so, the gate driving circuit 140 is controlled to output a non-operation voltage to the third scanning signal terminal G3 of the pixel circuit 40 to turn off the fourth transistor T4, so that the grayscale current signal is output to both the first light-emitting device 310 and the second light-emitting device 320. In this case, the second light-emitting device 320 fails to emit light due to the short circuit, and the first light-emitting device 310 emits light normally, thereby reducing the risk of the light-emitting sub-unit P' failing to emit light due to the short circuit of the second light-emitting device 320 and improving the product yield.

If not, the gate driving circuit 140 is controlled to output an operation voltage to the third scanning signal terminal G3 of the pixel circuit 40 to turn on the switch sub-circuit 42, so that the grayscale current signal is output to the second light-emitting device 320. In this case, the first light-emitting device 310 is connected to the fourth transistor T4 in parallel, the first light-emitting device 310 fails to emit light, and the second light-emitting device 320 emits light normally, which may avoid a significant difference between the brightness of the sub-pixel P in which both the first light-emitting device 310 and the second light-emitting device 320 emit light and the brightness of the sub-pixel P in which only the first light-emitting device 310 emits light.

Here, in each sub-pixel P, the first light-emitting device 310 or the second light-emitting device 320 emits light to reach the set brightness.

In some other examples, as shown in FIGS. 60 and 7C, the first scanning signal terminal G1 and the second scanning signal terminal G2 are coupled to different scanning signal lines GL, and the second scanning signal terminal G2 and the third scanning signal terminal G3 are coupled to a same scanning signal line. Here, the first light-emitting device 310 and the second light-emitting device 320 both emit light to reach the set brightness.

For example, as shown in FIGS. 6C and 7C, the first scanning signal terminal G1 is electrically connected to a first scanning signal line GL1.1, and the second scanning signal terminal G2 and the third scanning signal terminal G3 are both electrically connected to a second scanning signal line GL1.2.

In some embodiments, as shown in FIGS. 5, 6A, 6B and 60, all the light-emitting sub-units P' are arranged in a plurality of rows and a plurality of columns, and each row includes multiple light-emitting sub-units P' arranged in the first direction X, and each column includes multiple light-emitting sub-units P' arranged in the second direction Y.

It will be noted that the first direction X is substantially the same as the extending direction of the scanning signal line GL, and the second direction Y is substantially the same as the extending direction of the data line DL.

The multiple light-emitting sub-units P' in the same row may be electrically connected to the same scanning signal lines GL, and the multiple light-emitting sub-units P' in the same column may be electrically connected to the same data line DL. Moreover, the light-emitting sub-units P' in the same column may further be electrically connected to a same sensing voltage signal line SL.

It will be noted that the multiple light-emitting sub-units P' in the same row may be electrically connected to the same scanning signal lines GL, which means that scanning signal terminals that are the same as each other in the pixel circuits 40 of the multiple light-emitting sub-units P' in the same row are connected to the same scanning signal line GL, and scanning signal terminals that are different from each other in the pixel circuits 40 of the multiple light-emitting sub-units P' in the same row may be electrically connected to different scanning signal lines.

On this basis, the light-emitting sub-units P' in the same column are divided into multiple sub-pixels P, and each sub-pixel P may include, for example, two light-emitting sub-units P'.

As shown in FIGS. 6A, 6B and 6C, the two light-emitting sub-units P' in the sub-pixel P are arranged in the second direction Y. Two pixel circuits 40 in the sub-pixel P are electrically connected to the same data line DL. With such arrangement, the arrangement of the circuits in the display module 100 (referring to FIG. 2) is simple, and it is possible to make the data signals received by the plurality of pixel circuits 40 in the sub-pixel P the same.

In this case, in a case where any light-emitting sub-unit P' fails to emit light, the remaining light-emitting sub-unit(s) P' can still emit light, which may reduce the risk of each sub-pixel P failing to emit light, so that the number of defective pixels is reduced, and the display effect and product yield may be improved.

Figure 14:
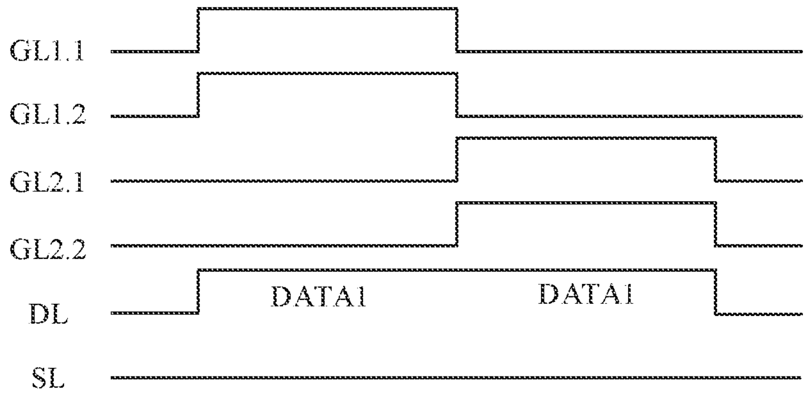
FIG. 14 is a timing diagram of a sub-pixel in which all light-emitting sub-units emit light, in accordance with some embodiments.
Figure 15:
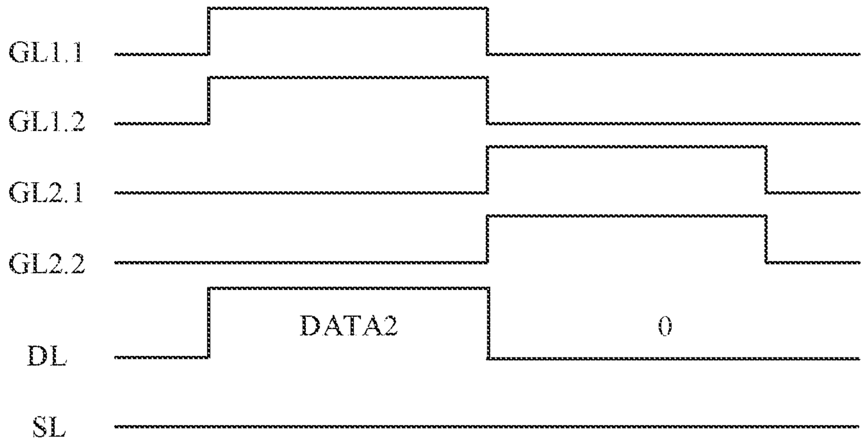
FIG. 15 is a timing diagram of a sub-pixel in which at least one light-emitting sub-unit does not emit light, in accordance with some embodiments.

FIG. 14 is a timing diagram of a sub-pixel in which all light-emitting sub-units emit light in accordance with some embodiments; FIG. 15 is a timing diagram of a sub-pixel in which at least one light-emitting sub-unit does not emit light in accordance with some embodiments.

Referring to FIGS. 6A, 14 and 15, the first data signal DATA1 is a data signal received by the sub-pixel P that can reach the set brightness in a case where each light-emitting sub-unit P' in the sub-pixel P emits light; the second data signal DATA2 is a data signal received by the sub-pixel P that can reach the set brightness in a case where at least one light-emitting sub-unit P' in the sub-pixel P fails to emit light. A voltage of the second data signal DATA2 is different from a voltage of the first data signal DATA1, so that the brightness of the sub-pixel P in which all the light-emitting sub-units P' emit light is substantially the same as the brightness of the sub-pixel P in which at least one light-emitting sub-unit of all the light-emitting sub-units fails to emit light.

For example, the voltage of the second data signal DATA2 is greater than the voltage of the first data signal DATA1.

On this basis, referring to FIGS. 5, 6A, 14 and 15, the source driving circuit 150 is configured to output the first data signal DATA1 or the second data signal DATA1 to the pixel circuit 40 in the sub-pixel P through the data line DL, the voltage of the second data signal DATA2 being greater than the voltage of the first data signal DATA1.

In addition, the processor 130 is electrically connected to the source driving circuit 150. Moreover, the processor 130 is configured to: determine location information of a target sub-pixel; and control, according to the location information, the source driving circuit 150 to output the second data signal DATA2 to the target sub-pixel, so that the brightness of the target sub-pixel is substantially the same as the brightness of the non-target sub-pixel.

It will be noted that the target sub-pixel is a sub-pixel P in which at least one light-emitting sub-unit P' does not fails to emit light, and the non-target sub-pixel is a sub-pixel P in which all light-emitting sub-units P' emit light.

In this case, the processor 130 may also control the magnitude of the current flowing through the light-emitting device 30 by controlling the magnitude of the data signal output from the source driving circuit 150 to the sub-pixel P, so as to avoid a significant difference between the brightness of the target sub-pixel and the brightness of the non-target sub-pixel.

In some embodiments, the processor 130 is further configured to: control the source driving circuit 150 to output the second data signal DATA2 to the pixel circuit 40 connected to the light-emitting device 30 emitting light in the target sub-pixel; and output no data signal to the pixel circuit 40 connected to the light-emitting device 30 failing to emit light in the target sub-pixel.

In this case, no data signal will be written to the data signal terminal D of the pixel circuit 40 connected to the light-emitting device 30 failing to emit light, so as to prevent the pixel circuit 40 from generating a dark-state current.

Figure 8:
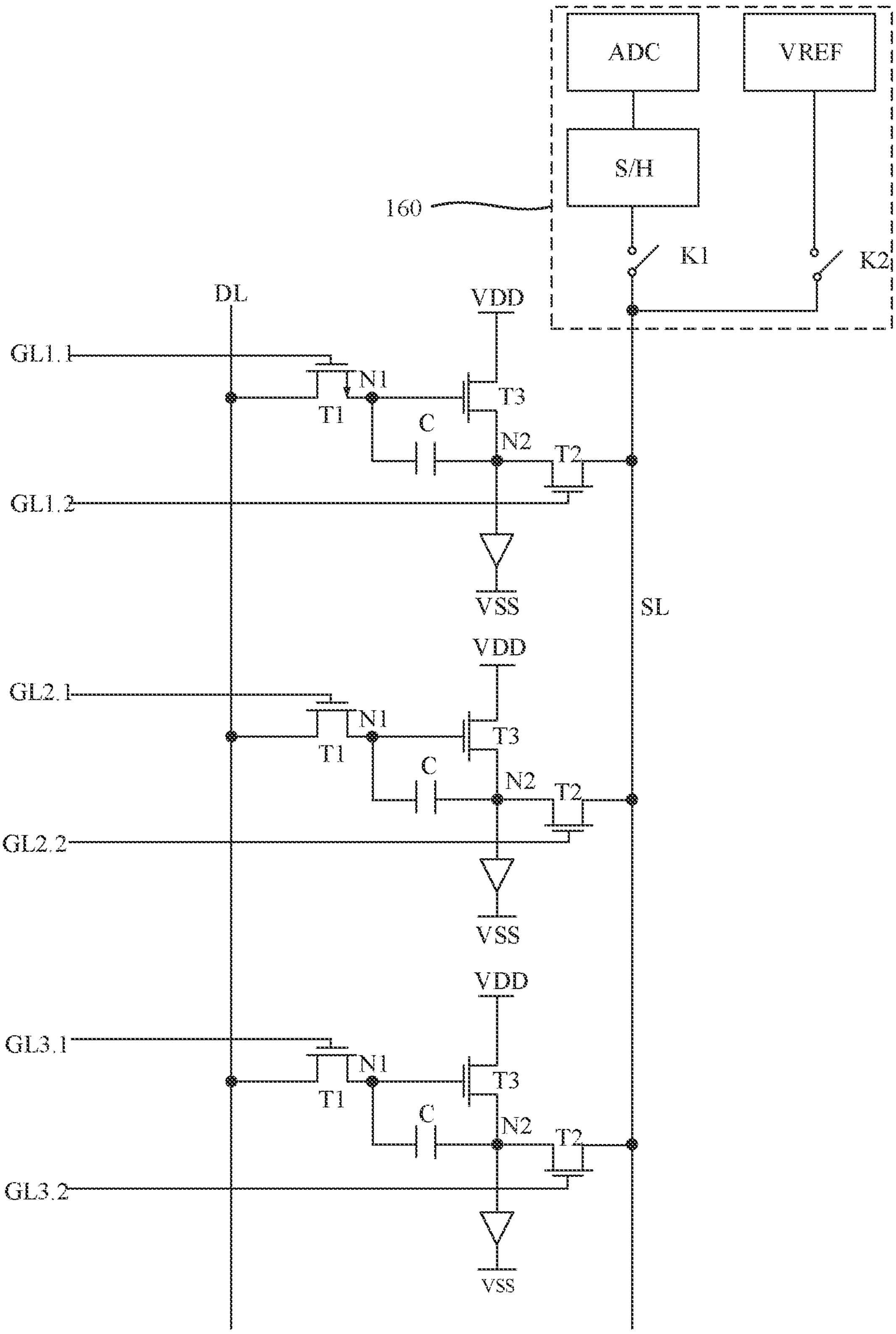
FIG. 8 is a structural diagram showing that a sampling sensing circuit is connected to a pixel circuit, in accordance with some embodiments.

In a case where the pixel circuit 40 adopts a manner of external compensation, referring to FIGS. 3 and 8, the display module 100 further includes a sensing voltage signal line SL and a sampling sensing circuit 160; the sampling sensing circuit 160 is electrically connected to the sensing voltage signal line SL, and the sensing voltage signal line SL Is electrically connected to the sub-pixels P.

The sampling sensing circuit 160 is configured to acquire sensing voltage signals of the pixel circuits 40 of each sub-pixel through the sensing voltage signal line SL.

In some embodiments, as shown in FIG. 8, the sampling sensing circuit 160 includes a first switch K1, a second switch K2, a sample hold circuit (S/H), and an analog-to-digital converter (ADC).

The sensing voltage signal line SL may be connected to the sample hold circuit S/H through the first switch K1, and the sample hold circuit S/H is connected to the analog-to-digital converter ADC; furthermore, the sensing voltage signal line SL is further connected to a reference voltage terminal VREF through the second switch K2.

Based on this, in the actual control process, by controlling the first switch K1 to be turned on and the second switch K2 to be turned off, it is possible to achieve the sampling of the voltage of the second node N2 through the sample hold circuit S/H and the analog-to-digital converter ADC. By controlling the first switch K1 to be turned off and the second switch K2 to be turned on, so as to input the voltage of the reference voltage terminal VREF to the second node N2.

It will be noted that, referring to FIG. 5, the sampling sensing circuit 160 may be integrated into a chip, and the chip may be disposed, for example, in the peripheral region B of the display panel 110 along the extending direction of the sensing voltage signal line SL.

Considering the pixel circuit 40 with the structure of "3T1C" provided in the embodiments of the present invention as an example in which the first scanning signal terminal G1 and the second scanning signal terminal G2 are connected to different scanning signal lines GL to describe the driving process of the pixel circuit 40 below.

Figure 9:
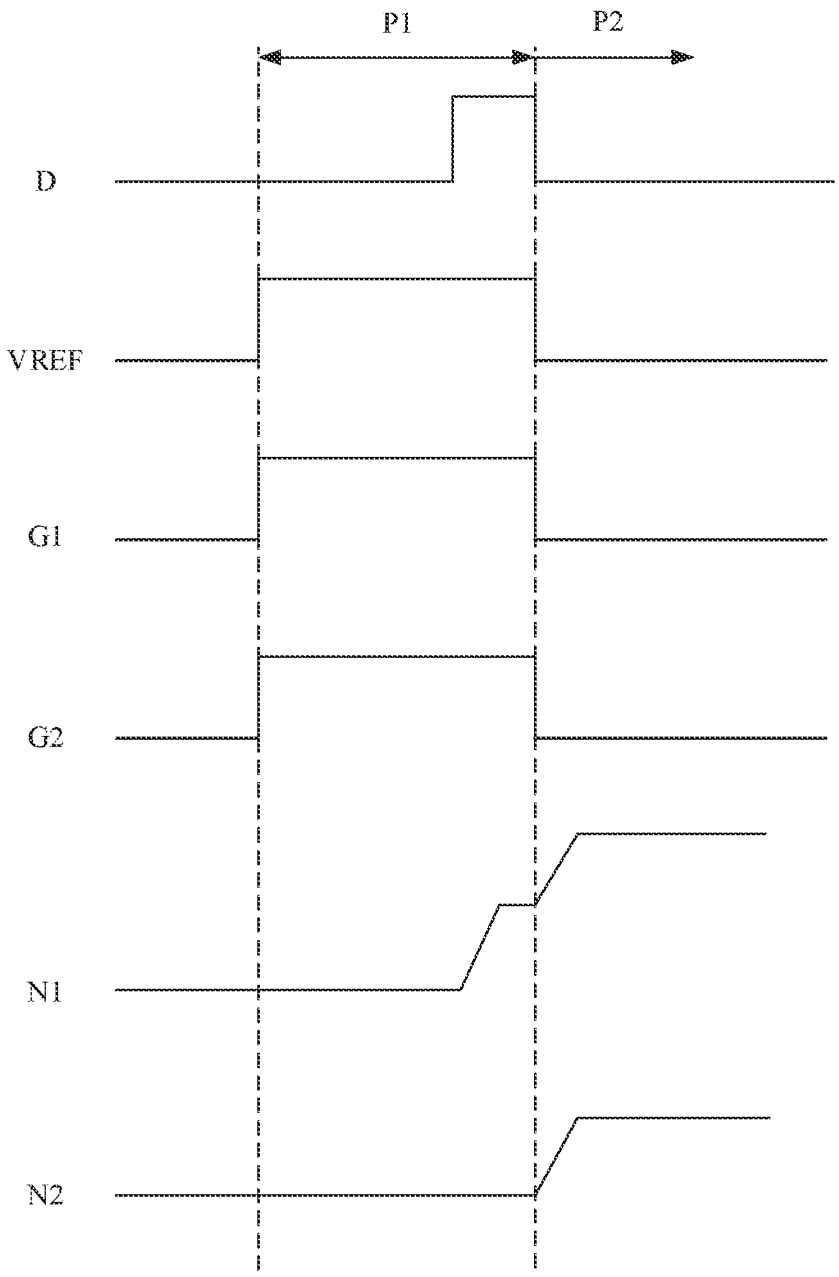
FIG. 9 is a timing diagram of a pixel circuit in a display phase, in accordance with some embodiments.
Figure 10:
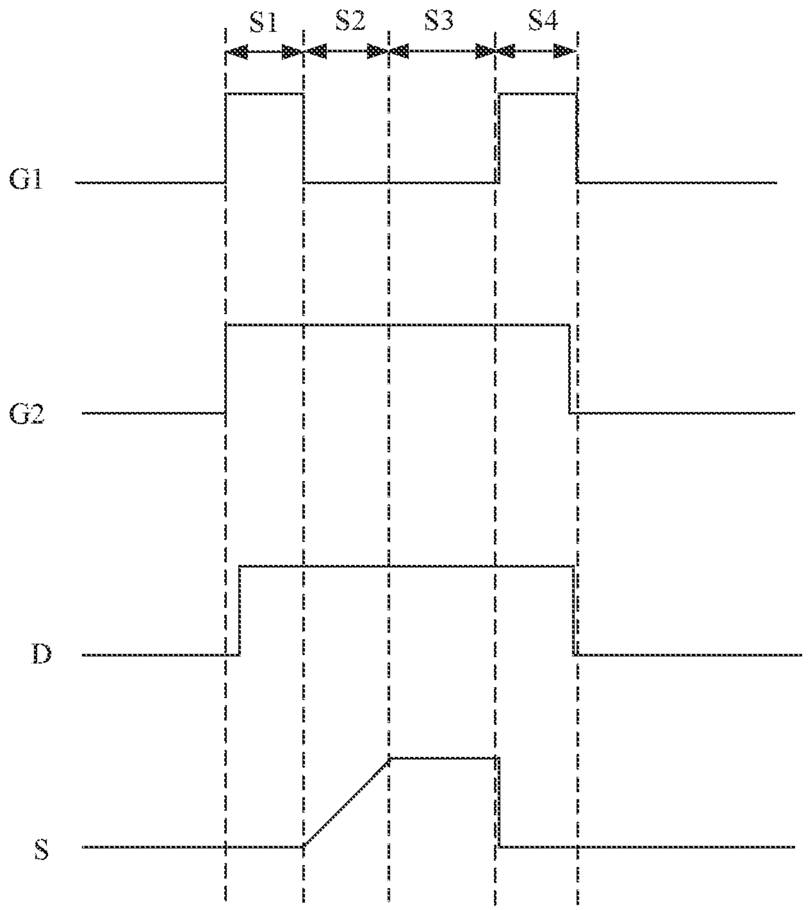
FIG. 10 is a timing diagram of a pixel circuit in a compensation sensing phase, in accordance with some embodiments.

FIG. 9 is a timing diagram of the pixel circuit in a display phase in accordance with some embodiments; FIG. 10 is a timing diagram of the pixel circuit in a compensation sensing phase in accordance with some embodiments.

As shown in FIGS. 9 and 10, a frame period of the display of the display module 100 includes a display phase and a compensation sensing phase.

As shown in FIG. 9, the display phase includes a pixel data writing stage P1 and a light-emitting stage P2.

Pixel Data Writing Stage P1

Referring to FIGS. 6A, 7A, and 9, the first scanning signal is input to the first scanning signal terminal G1, so that the first transistor T1 is turned on. In this case, the data signal is input to the data signal terminal D through the data line DL, and the data signal is stored in the storage capacitor C through the first transistor T1 that is turned on.

Referring to FIGS. 6A, 7A and 9, the second scanning signal is input to the second scanning signal terminal G2, so that the turned-on second transistor T2. In this case, with reference to FIG. 8, the reference voltage of the reference voltage terminal VREF is input to the second node N2 via the turned-on second transistor T2 through the sensing voltage signal line SL.

On this basis, the voltage of the first node N1 gradually increases, so that the third transistor T3 is turned on, and the voltage of the second node N2 gradually increases accordingly; the voltage of the first node N1 is further increased due to the bootstrap action of the storage capacitor C. Thus, the pixel circuit 40 enters the light-emitting stage P2, and the light-emitting device 30 starts to emit light.

In the pixel data writing stage P1, inputting the reference voltage of the reference voltage terminal VREF to the second node N2 via the turned-on second transistor T2 through the sensing voltage signal line SL connected to the second transistor T2 may include:

controlling the second switch K2 to be turned on and the first switch K1 to be turned off to input the reference voltage of the reference voltage terminal VREF to the second node N2 in each pixel circuit 40 in the turned-on row via the turned-on second transistor T2.

As shown in FIG. 10, the compensation sensing phase includes a data writing stage S1, a charging stage S2, a sampling stage S3 and a data write-back stage S4.

Referring to FIGS. 6A, 7A and 10, during the entire compensation sensing phase, a scanning signal is input to the second scanning terminal G2, and the second transistor T2 remains turned on. Moreover, during the compensation sensing phase, the data signal is input to the data signal terminal D.

Data Writing Stage S1

Referring to FIGS. 6A, 7A and 10, the scanning signal is input to the first scanning terminal G1, so that the first transistor T1 is turned on, and the data signal on the data line DL is input to the first node N1 and stored in the storage capacitor C. The sensing voltage signal line SL inputs the reference voltage to the second node N2 via the turned-on second transistor T2.

Inputting the reference voltage to the second node N2 via the turned-on second transistor T2 through the sensing voltage signal line SL may include:

controlling the second switches K2 connected to the sensing voltage signal line SL connected to each pixel circuit 40 in the current turned-on row to be turned on, and controlling all the first switches K1 to be turned off, so as to input the reference voltage of the reference voltage terminal VREF to the second node N2 in each pixel circuit 40 in the turned-on row via the second transistor T2.

Charging Stage S2

Referring to FIGS. 6A, 7A and 10, the sensing voltage signal line SL stops inputting the reference voltage to the second node N2, so that the second node N2 is in a floating state. In this case, due to the action of the voltage of the first node N1, the third transistor T3 is turned on, and the second node N2 starts to charge, i.e., charge the sensing voltage signal line SL.

Sampling Stage S3

Referring to FIGS. 6A, 7A and 10, after a period of charging in the charging stage S2, the voltage on the sensing voltage signal line SL remains substantially stable. In this case, the voltage on the sensing voltage signal line SL is acquired (that is, the voltage of the second node N2 connected to the sensing voltage signal line SL is acquired).

Acquiring the voltage on the voltage signal line SL may include:

controlling the first switch K1 to be turned on and the second switch K2 to be turned off to convert the voltage of the second node N2 in each pixel circuit 40 in the turn-on row passing through sequentially the sample hold circuit (S/H) and the analog-to-digital converter ADC to a corresponding digital signal.

The acquired digital signal corresponding to the voltage of the second node N2 is processed by subsequent data processing, calculation and the like to obtain the threshold voltage of the driving transistor, and then, the data signal may be compensated according to the threshold voltage in the subsequent display phase for display.

Data Write-back Stage S4

Referring to FIGS. 6A, 7A and 10, the scanning signal is input to the first scanning terminal G1, so that the first transistor T1 is turned on, and the data signal on the data line DL is input to the first node N1. The reference voltage is input to the second node N2 via the turned-on second transistor T2 through the sensing voltage signal line SL.

Inputting the reference voltage to the second node N2 via the turned-on second transistor T2 through the sensing voltage signal line SL may include:

controlling the second switch K2 to be turned on and the first switch K1 to be turned off to input the reference voltage of the reference voltage terminal VREF to the second node N2 in each pixel circuit 40 in the turned-on row via the turned-on second transistor T2.

In some embodiments, referring to FIGS. 5 and 8, the sampling sensing circuit 160 may acquire sensing voltage signals of the multiple pixel circuits 40 in a column of sub-pixels P through the same sensing voltage signal line SL.

For example, the plurality of light-emitting sub-units P' in the sub-pixel P are arranged in the second direction Y. The plurality of pixel circuits 40 in the sub-pixel P are electrically connected to the same sensing voltage signal line SL. With such arrangement, the arrangement of the circuits in the display module 100 is simple.

In addition, the processor 130 is further electrically connected to the sampling sensing circuit 160, and the processor 130 is further configured to determine a sensing voltage signal of all the pixel circuits 40 of the sub-pixel.

Here, the processor 130 is electrically connected to the gate driving circuit 140 the source driving circuit 150 and the sampling sensing circuit 160. The processor 130 is further configured to control the gate driving circuit 140, the source driving circuit 150 and the sampling sensing circuit 160 to acquire a sensing voltage signal of at least one pixel circuit 40 in each sub-pixel P.

Figure 11:
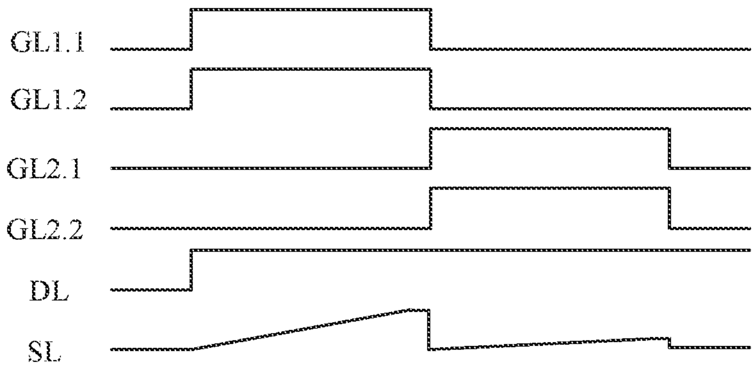
FIG. 11 is a timing diagram of the pixel circuit of the sub-pixel shown in FIG. 6A in a charging stage and a sampling stage.

In some examples, referring to FIGS. 6A and 11, the processor 130 is configured to control the gate driving circuit 140, the source driving circuit 150 and the sampling sensing circuit 160 to acquire sensing voltage signals of all the pixel circuits 40 in each sub-pixel.

In this case, the timing of the pixel circuit 40 in the charging stage S2 and the sampling stage S3 is shown in FIG. 11.

It will be noted that, in a same pixel circuit 40, since the signals received by the first scanning signal terminal S1 and a second scanning signal terminal S2 are the same, the first scanning signal terminal S1 and a second scanning signal terminal S2 may share a same scanning signal line GL as shown in FIG. 6B.

Here, the display module 100 may include, for example, one gate driving circuit 140, and each gate driving circuit 140 includes a plurality of cascaded shift registers RS. Each light-emitting sub-unit P' corresponds to a shift register RS, and the scanning signal line GL electrically connected to a light-emitting sub-unit P' is electrically connected to a shift register RS. In this way, in the charging stage S2 and the sampling stage S3, the first scanning signal terminal G1 and the second scanning signal terminal G2 of the plurality of pixel circuits 40 in each sub-pixel P are turned on, so that the sensing voltage signals of all the pixel circuits 40 in each sub-pixel P may be obtained.

In addition, the processor 130 is further configured to: determine a sensing voltage signal of any pixel circuit 40 in the non-target sub-pixel as a sensing voltage signal of all the pixel circuits 40 in the non-target sub-pixel; and determine whether the target sub-pixel emits light. If so, a sensing voltage signal of any pixel circuit 40 electrically connected to a light-emitting device 30 emitting light in the target sub-pixel is determined as a sensing voltage signal of all the pixel circuits 40 in the target sub-pixel. If not, a sensing voltage signal of any non-target sub-pixel adjacent to the target sub-pixel is determined as the sensing voltage signal of all the pixel circuits 40 in the target sub-pixel.

Figure 12:
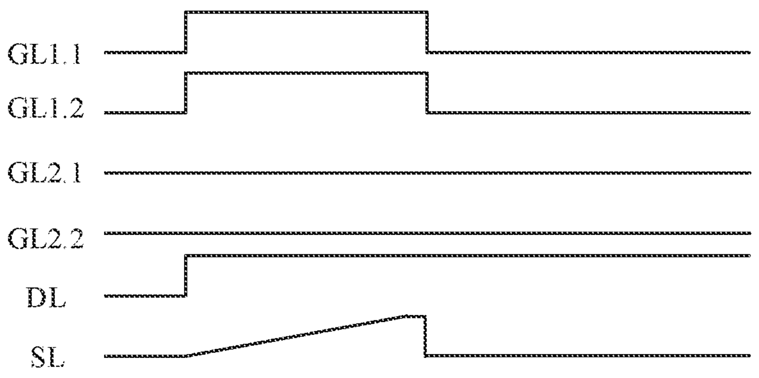
FIG. 12 is another timing diagram of the pixel circuit of the sub-pixel shown in FIG. 6A in a charging stage and a sampling stage.

In some other examples, referring to FIGS. 6A and 12, the processor 130 is configured to control the gate driving circuit 140, the source driving circuit 150 and the sampling sensing circuit 160 to acquire a sensing voltage signal of a pixel circuit 40 in each sub-pixel P.

In this case, the timing of the pixel circuit 40 in the charging stage S2 and the sampling stage S3 is shown in FIG. 12.

It will be noted that, in a same pixel circuit 40, since the signals received by the first scanning signal terminal S1 and a second scanning signal terminal S2 are the same, the first scanning signal terminal S1 and a second scanning signal terminal S2 may share a same scanning signal line GL as shown in FIG. 6B.

In addition, the processor 130 is further configured to: determine a sensing voltage signal acquired from the non-target sub-pixel as a sensing voltage signal of all the pixel circuits 40 in the non-target sub-pixel; and determine whether a difference between a sensing voltage signal acquired from the target sub-pixel and a sensing voltage signal acquired from any adjacent non-target sub-pixel is within a first preset range. If so, the sensing voltage signal acquired from the target sub-pixel is determined as the sensing voltage signal of all the pixel circuits 40 in the target sub-pixel. If not, the sensing voltage signal acquired from any non-target sub-pixel adjacent to the target sub-pixel is determined as the sensing voltage signal of all the pixel circuits 40 in the target sub-pixel. In this way, it is possible to achieve the sharing of the sensing voltage signal to reduce the data volume of the sensing voltage signal.

Alternatively, the processor 130 may further be configured to: determine the sensing voltage signal acquired from the non-target sub-pixel as the sensing voltage signal of all the pixel circuits 40 in the non-target sub-pixel; and determine whether the sensing voltage signal acquired from the target sub-pixel is within a second preset range. If so, the sensing voltage signal acquired from the target sub-pixel is determined as the sensing voltage signal of all the pixel circuits 40 in the target sub-pixel. If not, the sensing voltage signal acquired from any non-target sub-pixel adjacent to the target sub-pixel is determined as the sensing voltage signal of all the pixel circuits 40 in the target sub-pixel. In this way, it is possible to achieve the sharing of the sensing voltage signal to reduce the data volume of the sensing voltage signal.

It will be noted that, the first preset range may be set according to actual conditions; for example, the first preset range is −0.15 V to 0.15 V; the second preset range may be set according to actual conditions; for example, the second preset range is 0.5 V to 2.5 V.

Here, each sub-pixel P may include, for example, two light-emitting sub-units P', and the display module 100 may include, for example, two gate driving circuits 140, and each gate driving circuit 140 includes a plurality of cascaded shift registers RS. Each light-emitting sub-unit P' corresponds to a shift register RS. The scanning signal line GL electrically connected to the light-emitting sub-units P in odd rows is electrically connected to a shift register RS in a gate driving circuit 140; the scanning signal line GL electrically connected to the light-emitting sub-units P in even rows is electrically connected to a shift register RS in another gate driving circuit 140.

In this case, in the charging stage S2 and the sampling stage S3, one gate driving circuit 140 works, and the other gate driving circuit 140 does not work, and the first scanning signal terminal G1 and the second scanning signal terminal G2 of only one pixel circuit 40 in each sub-pixel P are turned on, so that the sensing voltage signal of the pixel circuit 40 in each sub-pixel P may be acquired.

Figure 13:
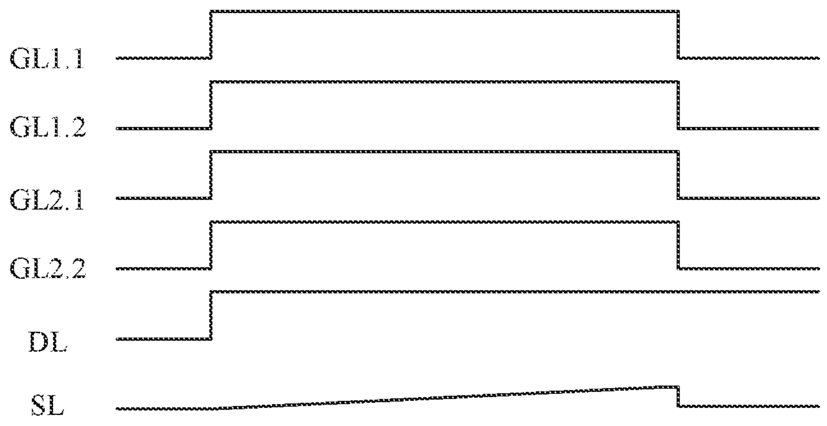
FIG. 13 is yet another timing diagram of the pixel circuit of the sub-pixel shown in FIG. 6A in a charging stage and a sampling stage.

In some other examples, referring to FIGS. 6A and 13, the processor 130 is configured to control the gate driving circuit 140, the source driving circuit 150 and the sampling sensing circuit 160 to acquire an average sensing voltage signal of the plurality of pixel circuits 40 in each sub-pixel P.

In this case, the timing of the pixel circuit 40 in the charging stage S2 and the sampling stage S3 is shown in FIG. 13.

It will be noted that, in a same pixel circuit 40, since the signals received by the first scanning signal terminal S1 and a second scanning signal terminal S2 are the same, the first scanning signal terminal S1 and a second scanning signal terminal S2 may share a same scanning signal line GL as shown in FIG. 6B.

In addition, the processor 130 is further configured to: determine an average sensing voltage signal acquired from the non-target sub-pixel as a sensing voltage signals of all the pixel circuits 40 in the non-target sub-pixel; and determine an average sensing voltage signal acquired from any non-target sub-pixel adjacent to the target sub-pixel as a sensing voltage signal of all the pixel circuits 40 in the target sub-pixel. In this way, it is possible to achieve the sharing of the sensing voltage signal to reduce the data volume of the sensing voltage signal.

It will be noted that, the average sensing voltage signal refers to a sensing voltage obtained by simultaneously acquiring the voltage, from the plurality of pixel circuits 40 in each sub-pixel P, on the sensing voltage signal line SL through the same sensing voltage signal line SL.

Here, the display module 100 may include, for example, a single gate driving circuit 140, and the gate driving circuit 140 includes a plurality of cascaded shift registers RS. All the pixel circuits 40 in each sub-pixel P are electrically connected to a shift register RS through multiple scanning signal lines GL.

Each sub-pixel P corresponds to a shift register RS, and multiple scanning signal lines GL electrically connected to a sub-pixel P are electrically connected to a shift register RS. In this way, in the charging stage S2 and the sampling stage S3, the first scanning signal terminals G1 and the second scanning signal terminals G2 of the plurality of pixel circuits 40 in each sub-pixel P are simultaneously turned on, so that the average sensing voltage signal of the plurality of pixel circuits 40 in each sub-pixel P may be obtained.

Figure 16:
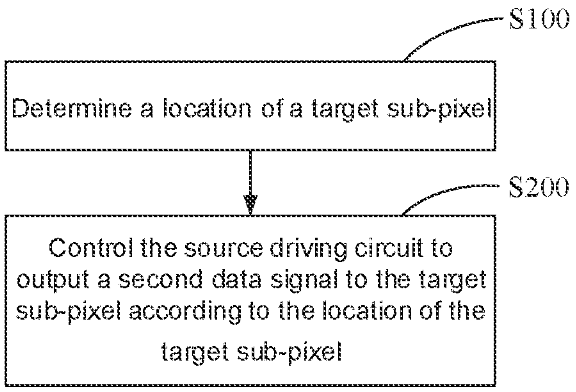
FIGS. 16 to 22 are flow diagrams of a method for repairing defective pixel, in accordance with some embodiments.

Some embodiments of the present disclosure provide a method for repairing defective pixel, which is applied to the display module described in any one of the embodiments. Referring to FIG. 16, the method for repairing defective pixel includes S100 to S200.

In S100, a location of a target sub-pixel is determined.

In the above step, the method for determining the location (i.e., the location information described in the embodiments related to the display module) of the target sub-pixel is not unique.

Figure 17:
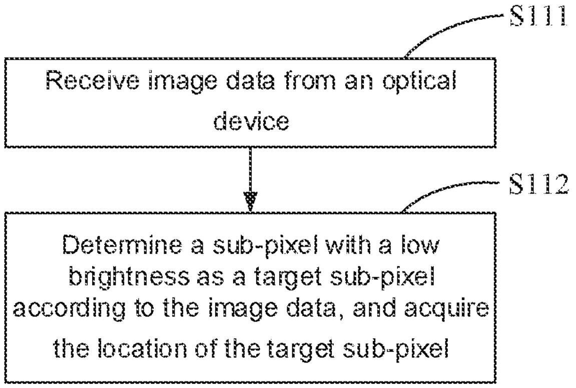

In some embodiments, referring to FIG. 17, S100 includes S111 to S112.

In S111, image data from an optical device is received.

In the above step, referring to FIG. 3, the optical device is coupled to the processor 130. The optical device may photograph the lit display panel 110 (referring to FIG. 5), and send the image data to the processor 130.

In S112, a sub-pixel with a low brightness is determined as a target sub-pixel according to the image data, and the location of the target sub-pixel is acquired.

In the above step, referring to FIG. 3, the processor 130 may locate the location of the target sub-pixel according to the image data, and store the location of the target sub-pixel for subsequent control process.

Figure 18:
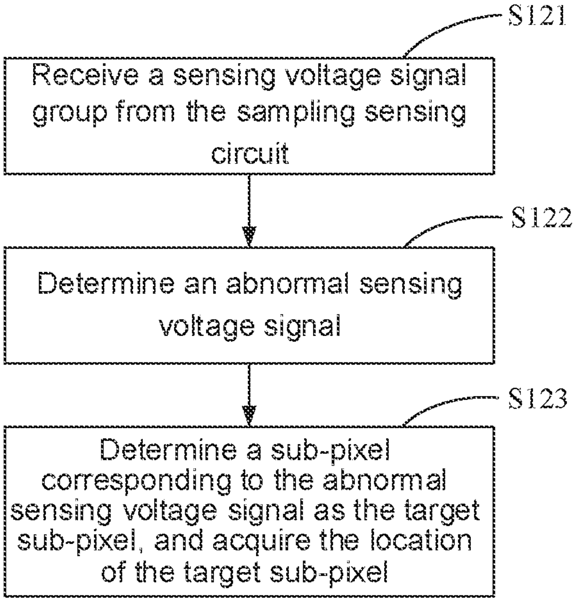

In some other embodiments, the display module 100 includes the sampling sensing circuit 160. In this case, referring to FIG. 18, S100 may include S121 to S123.

In S121, a sensing voltage signal group is received from the sampling sensing circuit.

In the above step, referring to FIG. 3, the processor 130 is electrically connected to the sampling sensing circuit 160 to receive the sensing voltage signal group from the sampling sensing circuit 160. The sensing voltage signal group includes sensing voltage signals of all the pixel circuits 40.

In S122, an abnormal sensing voltage signal is determined.

In some embodiments, the processor 130 may calculate a difference between a sensing voltage signal in the sensing voltage signal group and another adjacent sensing voltage signal, and compare the difference with a first preset range. A sensing voltage signal in the sensing voltage signal group whose difference from the another adjacent sensing voltage signal is outside the first preset range is determined as the abnormal sensing voltage signal.

That is, the abnormal sensing voltage signal is a sensing voltage signal in the sensing voltage signal group whose difference from the another adjacent sensing voltage signal is outside the first preset range. As shown in FIGS. 6A and 11, among the sensing voltage signals acquired by the sensing voltage signal line SL, the sensing voltage signal corresponding to the second light-emitting sub-unit P' is the abnormal sensing voltage signal.

It will be noted that, the first preset range may be set according to actual conditions; for example, the first preset range is −0.15 V to 0.15 V.

In some other embodiments, the processor 130 may compare a sensing voltage signal with a second preset range. A sensing voltage signal that is outside the second preset range is determined as the abnormal sensing voltage signal.

That is to say, the abnormal sensing voltage signal is a sensing voltage signal that is outside the second preset range. As shown in FIGS. 6A and 11, among the sensing voltage signals acquired by the sensing voltage signal line SL, the sensing voltage signal corresponding to the second light-emitting sub-unit P' is the abnormal sensing voltage signal.

It will be noted that the second preset range may be set according to actual conditions; for example, the second preset range is 0.5 V to 2.5 V.

In S123, a sub-pixel corresponding to the abnormal sensing voltage signal is determined as the target sub-pixel, and the location of the target sub-pixel is acquired.

In the above step, referring to FIGS. 3 and 5, the processor 130 may locate the sub-pixel P corresponding to the abnormal sensing voltage signal according to the abnormal sensing voltage signal, determine the sub-pixel P corresponding to the abnormal sensing voltage signal as the target sub-pixel, acquire the location of the target sub-pixel, and store the location of the target sub-pixel to apply to the subsequent control process.

In S200, the source driving circuit is controlled to output a second data signal to the target sub-pixel according to the location of the target sub-pixel.

In the above step, referring to FIGS. 3, 4 and 15, the processor 130 may control the source driving circuit 150 to output the second data signal DATA2 to the target sub-pixel according to the location of the target sub-pixel. In this way, the data signal received by the target sub-pixel may be increased, thereby increasing the current flowing through the light-emitting device(s) 30 in the target sub-pixel. As a result, the luminance of each light-emitting device 30 is increased, so that the brightness of the target sub-pixel is substantially the same as the brightness of the non-target sub-pixel.

Figure 19:
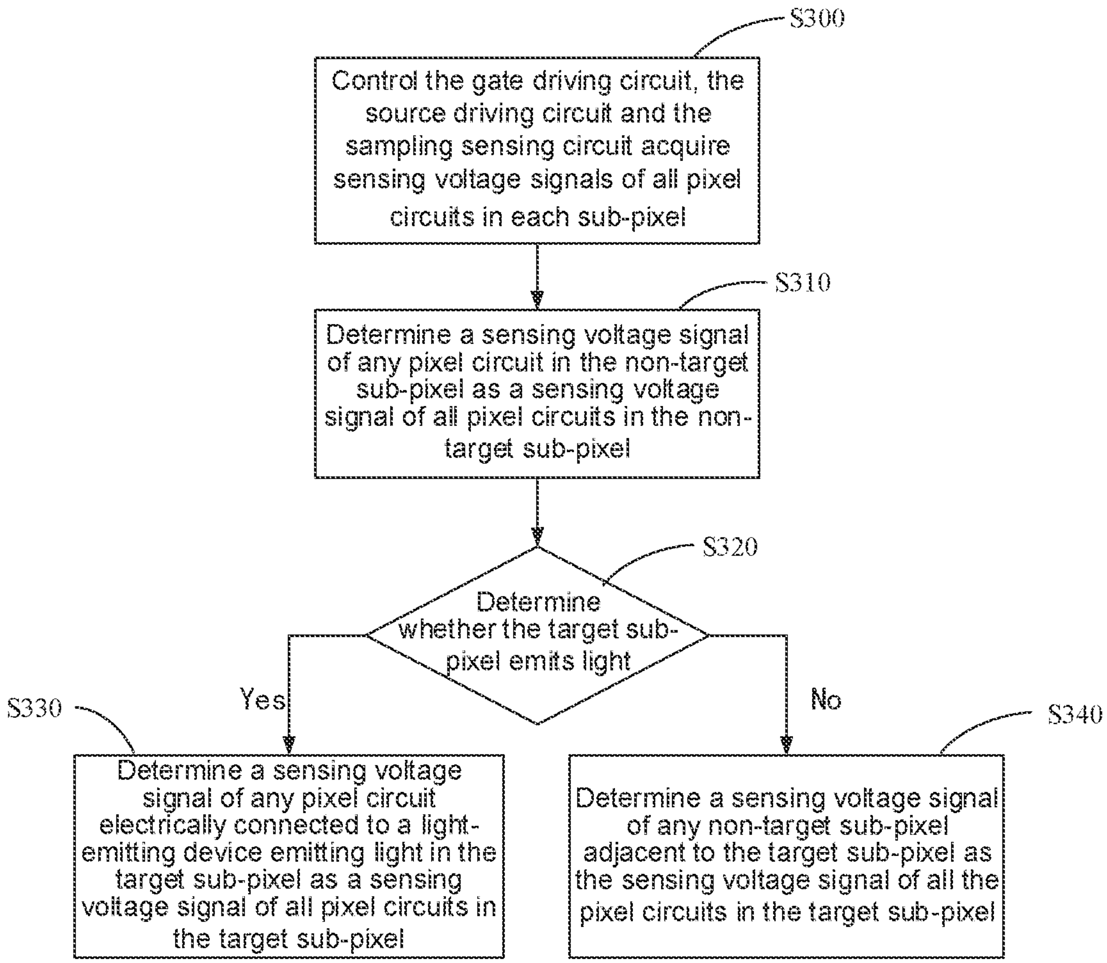

In some embodiments, referring to FIG. 19, the method for repairing defective pixel includes S300 to S340.

In S300, the gate driving circuit, the source driving circuit and the sampling sensing circuit are controlled to acquire sensing voltage signals of all the pixel circuits in each sub-pixel.

In the above step, referring to FIGS. 3, 6A and 11, the processor 130 may control the gate driving circuit 140, the source driving circuit 150 and the sampling sensing circuit 160, so that the waveform of the signals respectively transmitted by the scanning signal line GL, the data line DL and the sensing voltage signal line SL are shown in FIG. 11, so as to acquire the sensing voltage signals of all the pixel circuits 40.

In S310, a sensing voltage signal of any pixel circuit in the non-target sub-pixel is determined as a sensing voltage signal of all pixel circuits in the non-target sub-pixel.

In the above step, referring to FIGS. 3 and 6A, the processor 130 may determine the sensing voltage signal of any pixel circuit 40 in the non-target sub-pixel as the sensing voltage signal of all the pixel circuits 40 in the non-target sub-pixel, so as to achieve the sharing of the sensing voltage signal and reduce the data volume of the sensing voltage signal.

In S320, it is determined that whether the target sub-pixel emits light.

If so, the processor 130 performs S330.

In S330, a sensing voltage signal of any pixel circuit electrically connected to a light-emitting device emitting light in the target sub-pixel is determined as a sensing voltage signal of all pixel circuits in the target sub-pixel.

If not, the processor 130 performs S340.

In S340, a sensing voltage signal of any non-target sub-pixel adjacent to the target sub-pixel is determined as the sensing voltage signal of all the pixel circuits in the target sub-pixel.

After acquiring the sensing voltage signal, referring to FIGS. 3 and 7A, the processor 130 may obtain the threshold voltage of the third transistor T3 (driving transistor) in each sub-pixel by data processing, calculation, and the like according to the sensing voltage signal, and then to compensate the data signal according to the threshold voltage in the subsequent display phase for display.

Figure 20:
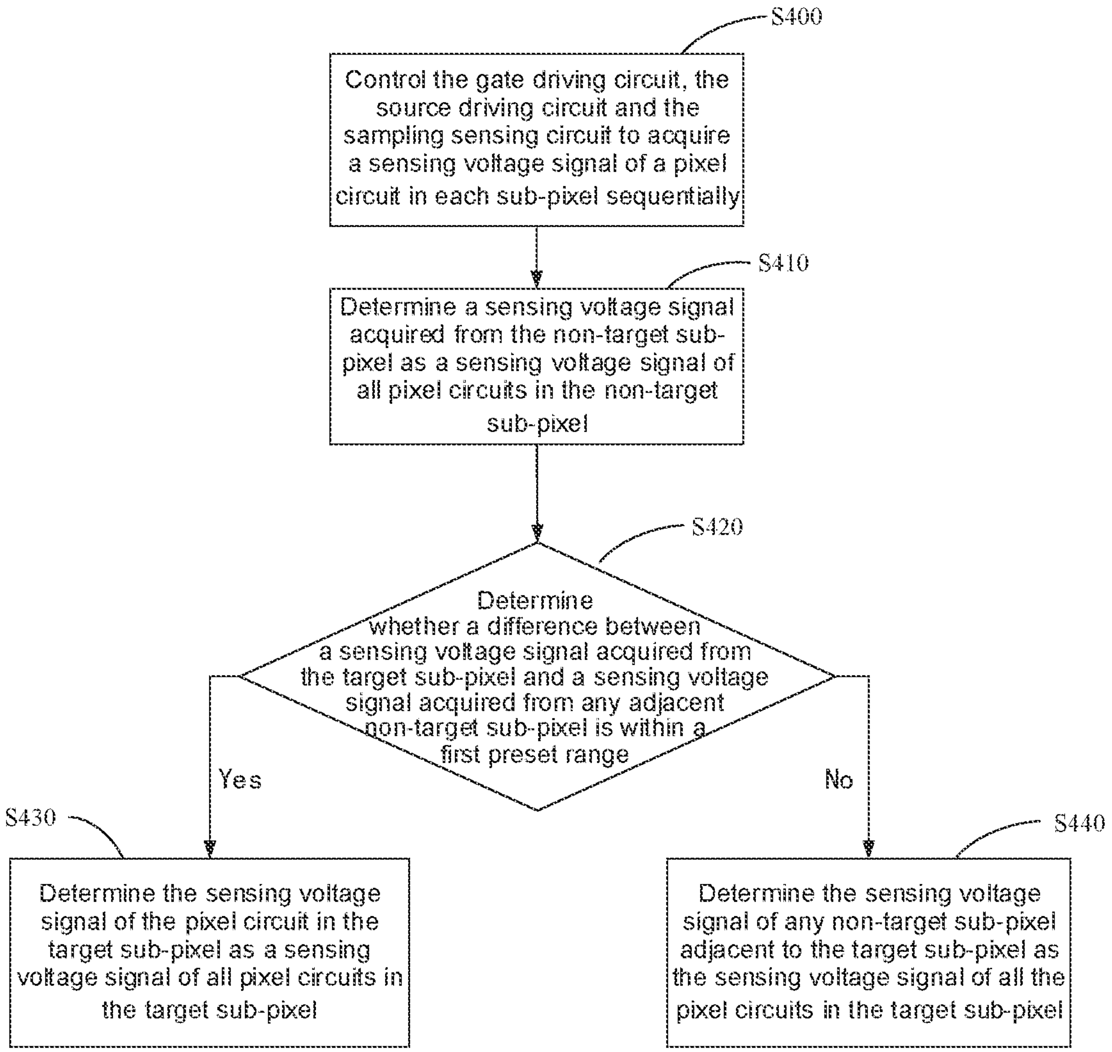

In some other embodiments, referring to FIG. 20, the method for repairing defective pixel includes S400 to S440.

In S400, the gate driving circuit, the source driving circuit and the sampling sensing circuit are controlled to acquire a sensing voltage signal of a pixel circuit in each sub-pixel.

In the above step, referring to FIGS. 3, 6A and 12, the processor 130 may control the gate driving circuit 140, the source driving circuit 150 and the sampling sensing circuit 160, so that the waveform of the signals respectively transmitted by the scanning signal line GL, the data line DL and the sensing voltage signal line SL are shown in FIG. 12, so as to acquire the sensing voltage signal of the pixel circuit 40 in each sub-pixel.

In S410, a sensing voltage signal acquired from the non-target sub-pixel is determined as a sensing voltage signal of all pixel circuits in the non-target sub-pixel.

In the above step, referring to FIGS. 3 and 6A, the processor 130 may determine the sensing voltage signal acquired from the non-target sub-pixel as the sensing voltage signal of all the pixel circuits 40 in the non-target sub-pixel, so as to achieve the sharing of the sensing voltage signal and reduce the data volume of the sensing voltage signal.

In S420, it is determined that whether a difference between a sensing voltage signal acquired from the target sub-pixel and a sensing voltage signal acquired from any adjacent non-target sub-pixel is within a first preset range.

It will be noted that, as for the description of the first preset range, reference may be made to the above description, and details will not be repeated here in the embodiments of the present disclosure.

If so, the processor 130 performs S430.

In S430, the sensing voltage signal of the pixel circuit in the target sub-pixel is determined as a sensing voltage signal of all pixel circuits in the target sub-pixel.

If not, the processor 130 performs S440.

In S440, the sensing voltage signal of any non-target sub-pixel adjacent to the target sub-pixel is determined as the sensing voltage signal of all the pixel circuits in the target sub-pixel.

After acquiring the sensing voltage signal, referring to FIGS. 3 and 7A, the processor 130 may obtain the threshold voltage of the third transistor T3 (driving transistor) in each sub-pixel by data processing, calculation, and the like according to the sensing voltage signal, and then to compensate the data signal according to the threshold voltage in the subsequent display phase for display.

Figure 21:
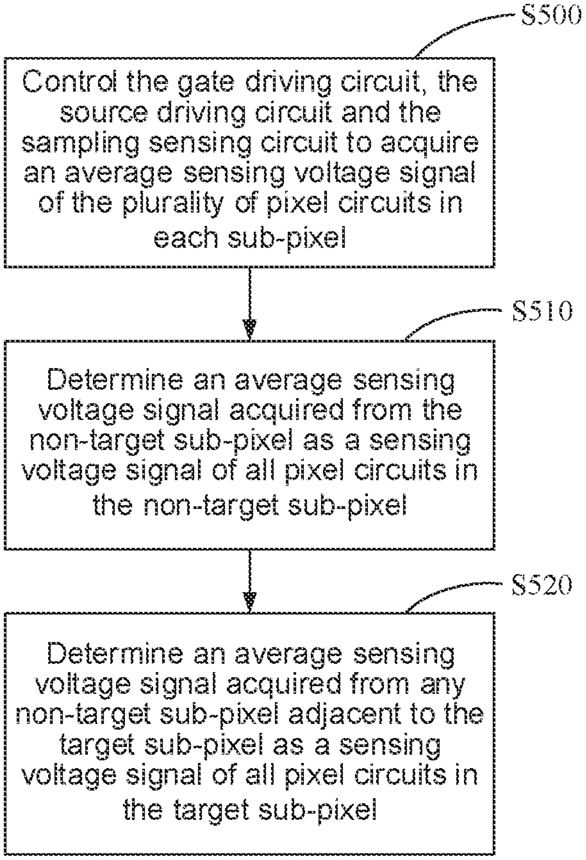

In yet some other embodiments, referring to FIG. 21, the method for repairing defective pixel includes S500 to S520.

In S500, the gate driving circuit, the source driving circuit and the sampling sensing circuit are controlled to acquire an average sensing voltage signal of the plurality of pixel circuits in each sub-pixel.

In the above step, referring to FIGS. 3, 6A and 12, the processor 130 may control the gate driving circuit 140, the source driving circuit 150 and the sampling sensing circuit 160, so that the waveform of the signals respectively transmitted by the scanning signal line GL, the data line DL and the sensing voltage signal line SL are shown in FIG. 13, so as to acquire the average sensing voltage signal of the plurality of pixel circuits 40 in each sub-pixel.

In S510, an average sensing voltage signal acquired from the non-target sub-pixel is determined as a sensing voltage signal of all pixel circuits in the non-target sub-pixel.

In S520, an average sensing voltage signal acquired from any non-target sub-pixel adjacent to the target sub-pixel is determined as a sensing voltage signal of all pixel circuits in the target sub-pixel.

After acquiring the sensing voltage signal, referring to FIGS. 3 and 7A, the processor 130 may obtain the threshold voltage of the third transistor T3 (driving transistor) in each sub-pixel by data processing, calculation, and the like according to the sensing voltage signal, and then to compensate the data signal according to the threshold voltage in the subsequent display phase for display.

Figure 22:
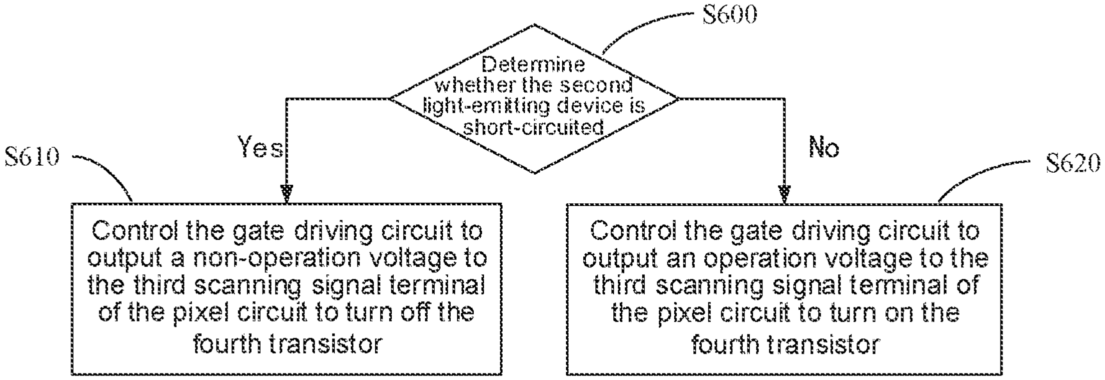

In some embodiments, referring to FIGS. 6C and 70, the light-emitting sub-unit P' includes a pixel circuit 40, a first light-emitting device 310, and a second light-emitting device 320, and the pixel circuit 40 includes a switch sub-circuit 42. Referring to FIG. 22, the method for repairing defective pixel further includes S600 to S620.

In S600, it is determined that whether the second light-emitting device is short-circuited.

In the above step, the processor 130 may determine whether the second light-emitting device 320 is short-circuited according to the image data and the brightness of the light-emitting sub-unit P'. If the light-emitting sub-unit P' is off or has low brightness, it means that the second light-emitting device 320 is short-circuited; if the brightness of the light-emitting sub-unit P' is substantially the same as the set brightness, it means that the second light-emitting device 320 is normal.

It will be noted that the image data may be obtained by photographing the lit display panel 110 (referring to FIG. 5) by an optical device, and then the image data may be sent to the processor 130.

In addition, the processor 130 may also determine whether the second light-emitting device 320 is short-circuited according to the sensing voltage signal.

For example, if the difference between the sensing voltage signal and the sensing voltage signal of another adjacent light-emitting sub-units P' is outside the first preset range, it means that the second light-emitting device 320 is short-circuited; if the difference between the sensing voltage signal and the sensing voltage signal of another adjacent light-emitting sub-units P' is within the first preset range, it means that the second light-emitting device 320 is normal.

It will be noted that, as for the description of the first preset range, reference may be made to the above description, and details will not be repeated here in the embodiments of the present disclosure.

For another example, if the sensing voltage signal is outside the second preset range, it means that the second light-emitting device 320 is short-circuited; if the sensing voltage signal is within the second preset range, it means that the second light-emitting device 320 is normal.

It will be noted that, as for the description of the second preset range, reference may be made to the above description, and details will not be repeated here in the embodiments of the present disclosure.

If so, the processor 130 performs S610.

In S610, if so, the gate driving circuit is controlled to output a non-operation voltage to the third scanning signal terminal of the pixel circuit.

In this case, referring to FIG. 70, the switch sub-circuit 42 is turned off, that is, the fourth transistor T4 is turned off, so that the grayscale current signal is output to both the first light-emitting device 310 and the second light-emitting device 320. In this case, the second light-emitting device 320 fails to emit light due to the short circuit, and the first light-emitting device 310 emits light normally, thereby reducing the risk of the light-emitting sub-unit P' failing to emit light due to the short circuit of the second light-emitting device 320 and improving the product yield.

If not, the processor 130 performs S620.

In S620, the gate driving circuit is controlled to output an operation voltage to the third scanning signal terminal of the pixel circuit.

In this case, referring to FIG. 7C, the switch sub-circuit 42 is turned on, that is, the fourth transistor T4 is turned on, so that the grayscale current signal is output to the second light-emitting device 320. In this case, the first light-emitting device 310 is connected to the fourth transistor T4 in parallel, the first light-emitting device 310 fails to emit light, and the second light-emitting device 320 emits light normally, which may avoid a significant difference between the brightness of the sub-pixel P in which both the first light-emitting device 310 and the second light-emitting device 320 emit light and the brightness of the sub-pixel P in which only the first light-emitting device 310 emits light.

Some embodiments of the present disclosure provide a computer-readable storage medium (for example, a non-transitory computer-readable storage medium), the computer-readable storage medium has stored thereon computer program instructions, and the computer program instructions, when executed on a computer (e.g., a display apparatus), cause the computer to perform the repairing method for the defective pixels according to any of the above embodiments.

For example, the computer-readable storage medium may include, but is not limited to a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure provide a computer program product, which is stored on, for example, a non-transitory computer-readable storage medium. The computer program product includes computer program instructions, and the computer program instructions, when executed on a computer (e.g., a display apparatus), cause the computer to perform the repairing method for the defective pixels according to the foregoing embodiments.

Some embodiments of the present disclosure provide a computer program. When executed on a computer (e.g., a display apparatus), the computer program causes the computer to perform the repairing method for the defective pixels as described in the above embodiments.

Beneficial effects of the computer-readable storage medium, the computer program product, and the computer program are the same as the beneficial effects of the repairing method for the defective pixels as described in some of the above embodiments, which will not be repeated here.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A display module, comprising:

a plurality of sub-pixels, wherein each sub-pixel includes a plurality of light-emitting sub-units, each light-emitting sub-unit includes a pixel circuit and at least one light-emitting device, and data signals received by a plurality of pixel circuits in each sub-pixel are the same;

a data line electrically connected to a sub-pixel;

a source driving circuit electrically connected to the data line; the source driving circuit being configured to output a first data signal or a second data signal to the sub-pixel through the data line, and a voltage of the second data signal is different from a voltage of the first data signal; and a processor electrically connected to the source driving circuit; wherein the processor is configured to:

determine location information of a target sub-pixel;

control, according to the location information, the source driving circuit to output the second data signal to a pixel circuit connect to a light-emitting device emitting light in the target sub-pixel, so that a brightness of the target sub-pixel is substantially the same as a brightness of a non-target sub-pixel; and control, according to the location information, the source driving circuit to output no data signal to a pixel circuit connected to a light-emitting device failing to emit light in the target sub-pixel;

wherein the target sub-pixel is a sub-pixel in which at least one light-emitting sub-unit fails to emit light, and the non-target sub-pixel is a sub-pixel in which all light-emitting sub-units emit light;

wherein the pixel circuit in each sub-pixel includes:

a driving sub-circuit coupled to a first scanning signal terminal, a second scanning signal terminal, a data signal terminal and a sensing voltage signal terminal; the driving sub-circuit being configured to output a grayscale current signal to the at least one light-emitting device under a control of a first scanning signal terminal from the first scanning signal terminal and a second scanning signal from the second scanning signal terminal; wherein in a case where each light-emitting sub-unit includes the pixel circuit and a light-emitting device, an anode of the light-emitting device is coupled to the driving sub-circuit, and a cathode of the light-emitting device is coupled to a second voltage signal terminal; and in a case where each light-emitting sub-unit includes the pixel circuit and a plurality of light-emitting devices, the plurality of light-emitting devices include:

a first light-emitting device, wherein an anode of the first light-emitting device is coupled to a first voltage signal terminal, and a cathode of the first light-emitting device is coupled to the driving sub-circuit; and a second light-emitting device, wherein an anode of the second light-emitting device is coupled to the driving sub-circuit, and a cathode of the second light-emitting device is coupled to the second voltage signal terminal.

2. The display module according to claim 1, further comprising:

a sensing voltage signal line electrically connected to the sub-pixel; and a sampling sensing circuit electrically connected to the sensing voltage signal line; the sampling sensing circuit being configured to acquire sensing voltage signals of pixel circuits of the sub-pixel through the sensing voltage signal line; wherein the processor is further electrically connected to the sampling sensing circuit, and the processor is further configured to determine a sensing voltage signal of all the pixel circuits of the sub-pixel.

3. The display module according to claim 2, further comprising:

scanning signal lines electrically connected to the sub-pixel; and a gate driving circuit electrically connected to the scanning signal lines; the gate driving circuit being configured to output scanning signals to the sub-pixel through the scanning signal lines; wherein the processor is further electrically connected to the gate driving circuit; the processor is further configured to control the gate driving circuit, the source driving circuit and the sampling sensing circuit to acquire a sensing voltage signal of at least one pixel circuit in each sub-pixel.

4. The display module according to claim 3, wherein the processor is configured to:

control the gate driving circuit, the source driving circuit and the sampling sensing circuit to acquire sensing voltage signals of all the pixel circuits in each sub-pixel;

determine a sensing voltage signal of any pixel circuit in the non-target sub-pixel as a sensing voltage signal of all pixel circuits in the non-target sub-pixel; and determine whether the target sub-pixel emits light;

in a case where the target sub-pixel emits light, determine a sensing voltage signal of any pixel circuit electrically connected to a light-emitting device emitting light in the target sub-pixel as a sensing voltage signal of all pixel circuits in the target sub-pixel; and in a case where the target sub-pixel does not emit light, determine a sensing voltage signal of any non-target sub-pixel adjacent to the target sub-pixel as the sensing voltage signal of all the pixel circuits in the target sub-pixel.

5. The display module according to claim 3, wherein the processor is configured to:

control the gate driving circuit, the source driving circuit and the sampling sensing circuit to acquire a sensing voltage signal of a pixel circuit of each sub-pixel;

determine a sensing voltage signal acquired from the non-target sub-pixel as a sensing voltage signal of all pixel circuits in the non-target sub-pixel; and determine whether a difference between a sensing voltage signal acquired from the target sub-pixel and a sensing voltage signal acquired from any adjacent non-target sub-pixel is within a first preset range;

in a case where the difference between the sensing voltage signal acquired from the target sub-pixel and the sensing voltage signal acquired from any adjacent non-target sub-pixel is within the first preset range, determine the sensing voltage signal acquired from the target sub-pixel as a sensing voltage signal of all pixel circuits in the target sub-pixel; and in a case where the difference between the sensing voltage signal acquired from the target sub-pixel and the sensing voltage signal acquired from any adjacent non-target sub-pixel is not within the first preset range, determine the sensing voltage signal of any non-target sub-pixel adjacent to the target sub-pixel as the sensing voltage signal of all the pixel circuits in the target sub-pixel.

6. The display module according to claim 3, wherein the processor is configured to:

control the gate driving circuit, the source driving circuit and the sampling sensing circuit to acquire an average sensing voltage signal of the plurality of pixel circuits in each sub-pixel;

determine an average sensing voltage signal acquired from the non-target sub-pixel as a sensing voltage signal of all pixel circuits in the non-target sub-pixel; and determine an average sensing voltage signal of any non-target sub-pixel adjacent to the target sub-pixel as a sensing voltage signal of all pixel circuits in the target sub-pixel.

7. The display module according to claim 1, wherein the display module further comprises scanning signal lines and sensing voltage signal lines, wherein all light-emitting sub-units in the plurality of sub-pixels are arranged in a plurality of rows and a plurality of columns; each row includes light-emitting sub-units arranged in a first direction, and each column includes light-emitting sub-units arranged in a second direction; the first direction is substantially the same as an extending direction of the scanning signal lines, and the second direction is substantially the same as an extending direction of the data line;

light-emitting sub-units in a same row are electrically connected to the same scanning signal lines, and light-emitting sub-units in a same column are electrically connected to a same data line; and the light-emitting sub-units in the same column are further electrically connected to a same sensing voltage signal line.

8. The display module according to claim 1, wherein in the case where each light-emitting sub-unit includes the pixel circuit and the plurality of light-emitting devices, the pixel circuit in each sub-pixel further includes: a switch sub-circuit coupled to a third scanning terminal, wherein the switch sub-circuit is configured to: under a control of a third scanning signal from the third scanning signal terminal, cause the grayscale current signal to be output to both the first light-emitting device and the second light-emitting device, or cause the grayscale current signal to be output to the second light-emitting device and no grayscale current signal to be output to the first light-emitting device; and/or an area of a light-emitting region of the first light-emitting device is greater than an area of a light-emitting region of the second light-emitting device.

9. The display module according to claim 8, further comprising a gate driving circuit and scanning signal lines; wherein the third scanning signal terminal and the first scanning signal terminal are electrically connected to different scanning signal lines, and the third scanning signal terminal and the second scanning signal terminal are electrically connected to different scanning signal lines; and/or at least two of the first scanning signal terminal, the second scanning signal terminal and the third scanning signal terminal are coupled to a same scanning signal line;

the switch sub-circuit is connected to the first light-emitting device in parallel, and the processor is further configured to determine whether the second light-emitting device is short-circuited;

in a case where the second light-emitting device is short-circuited, control the gate driving circuit to output a non-operation voltage to the third scanning signal terminal of the pixel circuit to turn off the switch sub-circuit;

in a case where the second light-emitting device is not short-circuited, control the gate driving circuit to output an operation voltage to the third scanning signal terminal of the pixel circuit to turn on the switch sub-circuit.

10. A display apparatus, comprising the display module according to claim 1.

11. A method for repairing defective pixel applied to the display module according to claim 1, comprising:

determining a location of the target sub-pixel;

controlling, according to the location of the target sub-pixel, the source driving circuit to output the second data signal to the pixel circuit connect to the light-emitting device emitting light in the target sub-pixel, so that the brightness of the target sub-pixel is substantially the same as the brightness of the non-target sub-pixel; and controlling, according to the location of the target sub-pixel, the source driving circuit to output no data signal to the pixel circuit connected to the light-emitting device failing to emit light in the target sub-pixel.

12. The method for repairing defective pixel according to claim 11, wherein the display module further includes a sampling sensing circuit and a gate driving circuit, and the method for repairing defective pixel further comprises:

controlling the gate driving circuit, the source driving circuit and the sampling sensing circuit acquire sensing voltage signals of all pixel circuits in each sub-pixel;

determining a sensing voltage signal of any pixel circuit in the non-target sub-pixel as a sensing voltage signal of all pixel circuits in the non-target sub-pixel; and determining whether the target sub-pixel emits light;

in a case where the target sub-pixel emits light, determining a sensing voltage signal of any pixel circuit electrically connected to a light-emitting device emitting light in the target sub-pixel as a sensing voltage signal of all pixel circuits in the target sub-pixel; and in a case where the target sub-pixel does not emit light, determining a sensing voltage signal of any non-target sub-pixel adjacent to the target sub-pixel as the sensing voltage signal of all the pixel circuits in the target sub-pixel.

13. The method for repairing defective pixel according to claim 11, wherein the display module further includes a sampling sensing circuit and a gate driving circuit, and the method for repairing defective pixel further comprises:

controlling the gate driving circuit, the source driving circuit and the sampling sensing circuit to acquire a sensing voltage signal of a pixel circuit in each sub-pixel;

determining a sensing voltage signal acquired from the non-target sub-pixel as a sensing voltage signal of all pixel circuits in the non-target sub-pixel; and determining whether a difference between a sensing voltage signal acquired from the target sub-pixel and a sensing voltage signal acquired from any adjacent non-target sub-pixel is within a first preset range;

in a case where the difference between the sensing voltage signal acquired from the target sub-pixel and the sensing voltage signal acquired from any adjacent non-target sub-pixel is within the first preset range, determining the sensing voltage signal of the pixel circuit in the target sub-pixel as a sensing voltage signal of all pixel circuits in the target sub-pixel; and in a case where the difference between the sensing voltage signal acquired from the target sub-pixel and the sensing voltage signal acquired from any adjacent non-target sub-pixel is not within the first preset range, determining the sensing voltage signal of any non-target sub-pixel adjacent to the target sub-pixel as the sensing voltage signal of all the pixel circuits in the target sub-pixel.

14. The method for repairing defective pixel according to claim 11, wherein the display module further includes a sampling sensing circuit and a gate driving circuit, and the method for repairing defective pixel further comprises:

controlling the gate driving circuit, the source driving circuit and the sampling sensing circuit to acquire an average sensing voltage signal of a plurality of pixel circuits in each sub-pixel;

determining an average sensing voltage signal acquired from the non-target sub-pixel as a sensing voltage signal of all pixel circuits in the non-target sub-pixel; and determining an average sensing voltage signal acquired from any non-target sub-pixel adjacent to the target sub-pixel as a sensing voltage signal of all pixel circuits in the target sub-pixel.

15. The method for repairing defective pixel according to claim 11, wherein the display module further includes a sampling sensing circuit, determining the location of the target sub-pixel includes:

receiving a sensing voltage signal group from the sampling sensing circuit; the sensing voltage signal group including sensing voltage signals of all pixel circuits;

determining an abnormal sensing voltage signal; the abnormal sensing voltage signal being a sensing voltage signal in the sensing voltage signal group whose difference from another adjacent sensing voltage signal is outside a first preset range;

determining a sub-pixel corresponding to the abnormal sensing voltage signal as the target sub-pixel; and acquiring the location of the target sub-pixel.

16. The method for repairing defective pixel according to claim 11, wherein the display module further includes a gate driving circuit, each light-emitting sub-unit includes a pixel circuit, a first light-emitting device and a second light-emitting device, and the pixel circuit includes a switch sub-circuit coupled to a third scanning signal terminal;

the method for repairing defective pixel further comprises:

determining whether the second light-emitting device is short-circuited;

in a case where the second light-emitting device is short-circuited, controlling the gate driving circuit to output a non-operation voltage to the third scanning signal terminal of the pixel circuit to turn off the switch sub-circuit; and in a case where the second light-emitting device is not short-circuited, controlling the gate driving circuit to output an operation voltage to the third scanning signal terminal of the pixel circuit to turn on the switch sub-circuit.

17. A non-transitory computer-readable storage medium having stored thereon computer program instructions that, when executed on a computer, cause the computer to perform the method for repairing defective pixel according to claim 11.

18. A computer program product stored on a non-transitory computer-readable storage medium, comprising computer program instructions, when executed on a computer, the computer program instructions causing the computer to perform the method for repairing defective pixel according to claim 11.

* * * * *